(12) United States Patent
Son et al.

(10) Patent No.: US 7,848,273 B2
(45) Date of Patent: Dec. 7, 2010

(54) SYSTEM AND METHOD FOR TRANSMITTING AND RECEIVING A TRAFFIC INDICATION MESSAGE IN A BROADBAND WIRELESS ACCESS COMMUNICATION SYSTEM

(75) Inventors: Yeong-Moon Son, Anyang-si (KR);
Chang-Hoi Koo, Seongnam-si (KR);
Jung-Je Son, Seongnam-si (KR);
Sung-Jin Lee, Suwon-si (KR); So-Hyun Kim, Suwon-si (KR); Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 12/472,123

(22) Filed: May 26, 2009

(65) Prior Publication Data

US 2009/0232081 A1   Sep. 17, 2009

Related U.S. Application Data

(62) Division of application No. 10/983,502, filed on Nov. 8, 2004.

(30) Foreign Application Priority Data

Nov. 7, 2003  (KR) .............................. 2003-78759

(51) Int. Cl.
*H04B 1/16* (2006.01)

(52) U.S. Cl. ................. 370/311; 370/312; 370/328; 370/314; 370/338; 455/574; 455/127.5; 455/550.1; 455/560; 455/561

(58) Field of Classification Search ................. 455/574; 370/311, 338, 329
See application file for complete search history.

(56) References Cited

U.S. PATENT DOCUMENTS 5,933,421 A   8/1999  Alamouti et al.

(Continued)

FOREIGN PATENT DOCUMENTS

EP   0 796 025   9/1997

(Continued)

OTHER PUBLICATIONS

Changhoi Koo et al., MOB_TRF-IND Message Length Reduction and MSS Power Savings in Sleep Mode, IEEE 802.16 Broadband Wireless Working Group, Nov. 7, 2003.

*Primary Examiner*—Charles N Appiah
*Assistant Examiner*—Randy Peaches
(74) *Attorney, Agent, or Firm*—The Farrell Law Firm, LLP

(57) ABSTRACT

A system and method for transmitting a traffic indication message in a Broadband Wireless Access communication system. A base station (BS) transmits the traffic indication message to mobile subscriber stations (MSSs). The traffic indication message includes information on a number of MSS groups and information on a number of traffic indication indexes, each of the MSS groups includes a predetermined number of MSSs, and each of the traffic indication indexes is assigned to each of the MSS groups, and includes a bitmap including a predetermined number of bits. The predetermined number of bits is identical to the number of the MSSs included in each of the MSS groups, each of the predetermined number of the bits is assigned to each of the MSSs included in each of the MSS groups, and represents operation instruction information for each of the MSSs.

8 Claims, 14 Drawing Sheets

U.S. PATENT DOCUMENTS

| | | | |
|---|---|---|---|
| 6,091,932 A | 7/2000 | Langlais | |
| 6,192,026 B1 | 2/2001 | Pollack et al. | |
| 6,477,382 B1 | 11/2002 | Mansfield et al. | |
| 6,493,547 B1 | 12/2002 | Raith | |
| 6,622,251 B1 * | 9/2003 | Lindskog et al. | 713/300 |
| 6,795,407 B2 | 9/2004 | Chesson | |
| 6,928,289 B1 | 8/2005 | Cho et al. | |
| 6,934,299 B2 | 8/2005 | Kaatz | |
| 7,130,668 B2 | 10/2006 | Chang et al. | |
| 7,274,929 B1 | 9/2007 | Banginwar | |
| 2005/0075148 A1 | 4/2005 | Park | |

FOREIGN PATENT DOCUMENTS

| | | |
|---|---|---|
| EP | 1 223 775 | 7/2002 |
| JP | 2002-223470 | 8/2002 |
| JP | 2003-249908 | 9/2003 |
| RU | 2187205 | 8/2002 |
| WO | WO 97/37504 | 10/1997 |
| WO | WO 99/22352 | 5/1999 |
| WO | WO 00/35209 | 6/2000 |
| WO | WO 02/27958 | 4/2002 |
| WO | WO 02/33989 | 4/2002 |
| WO | WO 03/051077 | 6/2003 |
| WO | WO 96/37062 | 11/2006 |

* cited by examiner

SYSTEM AND METHOD FOR TRANSMITTING AND RECEIVING A TRAFFIC INDICATION MESSAGE IN A BROADBAND WIRELESS ACCESS COMMUNICATION SYSTEM

PRIORITY

This application is a Divisional of U.S. application Ser. No. 10/983,502 filed Nov. 8, 2004, and claims priority under 35 U.S.C. §119 to an application filed in the Korean Intellectual Property Office on Nov. 7, 2003 and assigned Serial No. 2003-78759, the contents of which are incorporated herein by reference.

BACKGROUND OF THE INVENTION

1. Field of the Invention

The present invention relates generally to a Broadband Wireless Access (BWA) communication system, and in particular, to a method for transmitting a traffic indication message by a base station in a BWA communication system using an Orthogonal Frequency Division Multiplexing (OFDM)/Orthogonal Frequency Division Multiple Access (OFDMA).

2. Description of the Related Art

In a $4^{th}$ generation (4G) communication system, which is a next generation communication system, active research is being conducted on technology for providing users with services guaranteeing various Qualities-of-Service (QoSs) at a data rate of about 100 Mbps.

A current $3^{rd}$ generation (3G) communication system generally supports a data rate of about 384 Kbps in an outdoor channel environment having a relatively poor channel environment, and supports a data rate of a maximum of about 2 Mbps in an indoor channel environment having a relatively good channel environment. A Wireless Local Area Network (LAN) system and a Wireless Metropolitan Area Network (MAN) system generally support a data rate of 20 Mbps to 50 Mbps.

Therefore, in the current 4G communication system, active research is being performed on a new communication system securing mobility and QoS for the Wireless LAN system and the Wireless MAN system supporting a relatively high data rate in order to support a high-speed service that the 4G communication system intends to provide.

The Wireless MAN system having wide coverage and supporting a high data rate is suitable for a high-speed communication service. However, because the Wireless MAN system does not consider the mobility of users or subscriber stations (SSs), it never considers a handoff caused by high-speed movement of subscriber stations.

In FIG. 1, a description will be made of a configuration of a communication system employing an IEEE (Institute of Electrical and Electronics Engineers) 802.16a standard, i.e., a standard specification for the Wireless MAN system (hereinafter referred to as an "IEEE 802.16a communication system). More specifically, FIG. 1 is a diagram schematically illustrating a BWA communication system using an OFDM/OFDMA.

However, before a description of FIG. 1 is given, it is well known that the Wireless MAN system, i.e., a BWA communication system, has wider coverage and supports a higher data rate compared with the Wireless LAN system. The IEEE 802.16a communication system refers to a communication system utilizing an OFDM/OFDMA to support a broadband transmission network for a physical channel of the Wireless MAN system.

That is, the IEEE 802.16a communication system refers to a BWA communication system employing OFDM/OFDMA. The IEEE 802.16a communication system, as it applies OFDM/OFDMA to the Wireless MAN system, transmits a physical channel signal using multiple subcarriers, thereby enabling high-speed data transmission.

An IEEE 802.16e communication system is a communication system that considers mobility of subscriber stations in the IEEE 802.16a communication system. Currently, no specification has been provided for the IEEE 802.16e communication system.

As a result, both the IEEE 802.16a communication system and the IEEE 802.16e communication system correspond to a BWA communication system utilizing OFDM/OFDMA, and for convenience, the following description will be made with reference to the IEEE 802.16a communication system. In the description below, a term "mobile station (MS)" or "mobile subscriber station (MSS)" is used to describe a "subscriber station (SS)" that it has mobility.

Referring to FIG. 1, the IEEE 802.16a communication system has a single-cell configuration, and includes a base station (BS) 100 and a plurality of subscriber stations (SSs) 110, 120, and 130, which are controlled by the BS 100. Signal transmission and reception is achieved between the BS 100 and the SSs 110, 120, and 130 is achieved using OFDM/OFDMA.

In the IEEE 802.16e communication system, if mobility of subscriber stations is taken into consideration, power consumption of the subscriber stations is an important factor for the system. Therefore, a sleep mode operation and an awake mode operation between the BS and the subscriber stations have been proposed to minimize the power consumption of the subscriber stations.

FIG. 2 is a diagram schematically illustrating a sleep mode operation proposed in the IEEE 802.16e communication system. However, before a description of FIG. 2 is given, it is noted that the sleep mode has been proposed to minimize power consumption of an MSS in an idle interval for which no packet data is transmitted during packet data transmission. That is, in the sleep mode, both the MSS and the BS state transition to the sleep mode, thereby minimizing power consumption of the MSS in the idle interval for which no packet data is transmitted.

Generally, the packet data is generated on a burst-by-burst basis. Therefore, it is unreasonable that an interval for which no packet data is transmitted is identical in operation to an interval for which packet data is transmitted. Accordingly, the sleep mode has been proposed. However, when there is transmission packet data while the BS and the MSS are in the sleep mode state, both the BS and the MSS must simultaneously state transition to an awake mode to exchange the packet data.

The sleep mode has been proposed to minimize not only the power consumption but also interference between channel signals. However, because the packet data is considerably affected by traffic, the sleep mode operation should be performed considering a traffic characteristic and a transmission method of the packet data.

Referring to FIG. 2, reference numeral 211 represents a packet data generation pattern. The packet data generation pattern includes multiple ON-intervals and multiple OFF-intervals. The ON-intervals correspond to burst intervals for which packet data, or traffic, is generated, and the OFF-intervals correspond to idle intervals for which no traffic is generated.

The MSS and the BS state transition to the sleep mode or the awake mode according to the traffic generation pattern, thereby minimizing power consumption of the MSS and removing interference between channel signals.

Reference numeral 213 represents state transition (or mode change) of the BS and the MSS. The state transition pattern includes multiple awake modes and multiple sleep modes. In the awake modes, in which traffic is generated, packet data is exchanged between the BS and the MSS. However, in the sleep modes, when no traffic is generated, no packet data is exchanged between the BS and the MSS.

Reference numeral 215 represents an MSS power level pattern. As illustrated in FIG. 2, a power level of the MSS in the awake mode is defined as 'K', and a power level of the MSS in the sleep mode is defined as "M." Comparing the power level K of the MSS in the awake mode with the power level M of the MSS in the sleep mode, the power level M is much lower than the power level K. That is, in the sleep mode, almost no power is consumed because no packet data is exchanged.

In operation, a MSS should receive a state transition approval from a BS in order to make a state transition to the sleep mode, and the BS transmits packet data after permitting the MSS to make a state transition to the sleep mode.

In addition, the BS should inform that there is packet data to be transmitted to the MSS, during a listening interval of the MSS. In this case, the MSS should awake from the sleep mode and determines if there is packet data to be transmitted from the BS.

If it is determined that there is packet data to be transmitted from the BS, the MSS state transitions to the awake mode and receives the packet data from the BS. However, if it is determined that there is no packet data to be transmitted from the BS, the MSS can return to the sleep mode.

A description will now be made of the parameters required to support the sleep mode operation and the awake mode operation.

(1) Basic Connection Identifier (CID)

A CID proposed in the IEEE 802.16e communication system is illustrated in Table 1, and is used for identifying a connection between a BS and an MSS.

With reference to Table 1, a description will now be made of each CID.

Initial Ranging CID: This is a CID for a ranging request (RNG-REQ) message that an MSS transmits to a BS in order to be allocated a Primary Management CID and a Basic CID, and all MSSs should know a value 0x0000 of the Initial Ranging CID. In an Association process to the BS, the MSS informs the BS of its own MAC address through a ranging request message, such that the BS preferentially maps a MAC address of the MSS, a CID indicating the MSS, for example, a Primary Management CID described below, and a Basic CID.

Primary Management CID: This is a CID used for MAC Management message processing, which should be necessarily performed between a MSS and a BS, and the Primary Management CID is used for identifying the MSS. As illustrated in Table 1, one BS can manage/identify m MSSs.

Herein, 'm' refers to the number of MSSs that can be managed by the BS, and can have a different value according to capacity of the BS. The Primary Management CID is a CID that the MSS acquires by a ranging response (RNG-RSP) message.

Basic CID: This is a CID used for MAC Management message processing, which should be optionally performed between a MSS and a BS, and the Basic CID is used for identifying the MSS. As illustrated in Table 1, the Basic CID covers m MSSs, like the Primary Management CID. In addition, the Basic CID, like the Primary Management CID, is a CID that the MSS acquires by a ranging response message.

Broadcast CID: This is a CID indicating a message that all MSSs should receive and process, and the Broadcast CID has a value 0xFFFF that all MSSs already know.

Multicast Polling CID: This is a CID allocated/released by a Multicast Polling Allocation Request (MPA-REQ)

TABLE 1

| CID | Value | Description |
| --- | --- | --- |
| Initial Ranging | 0x0000 | Used by an MSS during initial ranging as part of network entry process |
| Basic CID | 0x0001~m | |
| Primary Management CIDs | m + 1~2m | |
| Transport CIDs and Secondary Management CIDs | 2m + 1~0xFEFF | |
| Adaptive Antenna System (AAS) initial ranging CID | 0xFF00 | A BS supporting AAS shall use this CID when allocating a Initial Ranging period for AAS devices |
| Multicast Polling CIDs | 0xFF00~0xFFFE | An MSS may be included in one or more multicast groups for the purposes of obtaining bandwidth via polling. These connections have no associated service flow |
| Broadcast CID | 0xFFFF | Used for broadcast information that is transmitted on a downlink to all MSSs |

As illustrated in Table 1, the CID has a size of 16 bits, and is generally used for a header of a Medium Access Control (MAC) frame to identify a connection. Alternatively, however, the CID is also used for a MAC Service Data Unit (SDU), like a CID described below with reference to a traffic indication message.

message, and the Multicast Polling CID is used in Multicast Polling Service and can make a total of 253 multicast groups.

Transport CID: This is a CID used for transmission/reception of general user data traffic. The Transport CID is allocated through a Dynamic Service Addition Response (DSA-RSP) message responsive to a BS-Initiated DSA Request (DSA-REQ) message and an MSS-Initiated DSA-REQ message, and the total number of available Transport CIDs is calculated as shown in Equation (1).

Maximum Number of Transport CIDs=Total Number (65535) of CIDs−Number (m) of Primary Management CIDs−Number (m) of Basic CIDs−Number (1) of Initial Ranging CIDs−Number (1) of Broadcast CIDs  (1)

Secondary Management CID: This represents a CID for management connection for an upper layer such as Simple Network Management Protocol (SNMP)/Trivial File Transfer Protocol (TFTP), and is allocated by a registration response (REG-RSP) message. The total number of available Secondary Management CIDs falls within the same range as the number of the Transport CIDs, but a part of the Secondary Management CIDs is used within the range.

Adaptive Antenna System (AAS) Initial Ranging CID: This is a CID used for allocating an Initial Ranging period for AAS devices by a BS supporting an AAS.

The Basic CID is used to identify an MSS by a BS. In addition, the Basic CID is allocated by an RNG-RSP message received from the BS while the MSS is performing an Association process to the BS, i.e., performing ranging. That is, the Basic CID is one of the CIDs that the BS maps to unique MAC addresses of the MSSs on a one-to-one basis. In addition, until the MSS is de-associated, the Basic CID is used for designating only the MSS, and has a unique value only within one BS. Therefore, the Basic CID can be used for designating a particular MSS in one BS.

For the MSS, the BS allocates the 16-bit Basic CID value, and the BS can allocate as many Basic CID values as the maximum number of MSSs that the BS can manage. For example, if the BS can manage m MSS, the Basic CID has a value between 1 and m.

(2) Sleep Interval

The sleep interval can be requested by an MSS and can be allocated by a BS in response to a request from the MSS. The sleep interval represents a time interval for which the MSS maintains the sleep mode until a start of the listening interval, after state transitioning to the sleep mode. That is, the sleep interval is defined as a time for which the MSS stays in the sleep mode.

Even after the sleep interval, the MSS can continuously stay in the sleep mode if there is no transmission data from the BS. In this case, the MSS updates the sleep interval by increasing the sleep interval using an initial-sleep window value and a final-sleep window value.

The initial-sleep window value is an initial minimum value of the sleep interval, and the final-sleep window value is a final maximum value of the sleep interval. In addition, the initial-sleep window value and the final-sleep window value can be represented by a number of frames, and both are allocated by the BS. A more detailed description of the initial-sleep window value and the final-sleep window value will be made herein below.

(3) Listening Interval

The listening interval is a parameter existing in a registration response (REG-RSP) message transmitted from the BS to the MSS in response to a registration request (REG-REQ) message transmitted from the MSS to the BS in a Registration process of the MSS. The listening interval represents a time interval for which the MSS awakes from the sleep mode for a while and receives downlink messages such as a traffic indication (TRF_IND) message in synchronism with a downlink signal from the BS.

The traffic indication message indicates the presence of a traffic message, or packet data, to be transmitted to the MSS, and a detailed description thereof will be made below. That is, the MSS continuously waits for the traffic indication message for the listening interval, and if a Basic CID designating the MSS exists in the traffic indication message (Positive Basic CID), the MSS continuously maintains the awake mode, state transitioning to the awake mode. However, if the listening interval expires while no Basic CID designating the MSS exists in the received traffic indication messages (Negative Basic CID), the MSS state transitions to the sleep mode.

(4) Sleep Interval Update Algorithm

After a state transition to the sleep mode, the MSS determines a sleep interval, regarding a predetermined initial-sleep window value as a minimum sleep mode period. After expiration of the sleep interval, the MSS awakes from the sleep mode, and then state transitions to the listening interval. For the listening interval, the MSS continuously determines if there is packet data to be transmitted from the BS. If it is determined that there is no transmission packet data for the listening interval, the MSS doubles the sleep interval and returns to the sleep mode.

More specifically, for example, if the initial-sleep window value is '2', the MSS sets the sleep interval to 2 frames and remains in the sleep mode during the 2 frames. After expiration of the 2 frames, the MSS awakes from the sleep mode and determines if the traffic indication message is received from the BS.

If it is received the traffic indication message for the listening interval, the MSS determines if a Basic CID exists in the received traffic indication message. If it is determined that the Basic CID does not exist in the received traffic indication message, the MSS sets the sleep interval to 4 frames, i.e., doubles the sleep interval, and remains in the sleep mode during the 4 frames.

Accordingly, the sleep interval increases from the initial-sleep window value to the final-sleep window value, and such an update algorithm is called the Sleep Interval Update Algorithm.

Below, a description will now be made of messages currently defined in the IEEE 802.16e communication system for supporting the sleep mode operation and the awake mode operation described above.

(1) Sleep Request (SLP-REQ) Message

The Sleep Request message is transmitted from an MSS to a BS, and is used by the MSS to request a state transition to the sleep mode. The Sleep Request message includes parameters, or information elements (IEs), required by the MSS to operate in the sleep mode. A format of the Sleep Request message is illustrated in Table 2.

TABLE 2

| SYNTAX | SIZE | NOTES |
|---|---|---|
| SLP-REQ_MESSAGE_FORMAT( ) { | | |
| MANAGEMENT MESSAGE TYPE = 45 | 8 bits | |
| INITIAL-SLEEP WINDOW | 6 bits | |
| FINAL-SLEEP WINDOW | 10 bits | |
| } | | |

The Sleep Request message is a dedicated message transmitted to the BS, according to information identified by the Basic CID of the MSS. The information elements of the Sleep Request message illustrated in Table 2 will be described below.

Management Message Type is information indicating a type of a current transmission message, and Management Message Type=45 represents the Sleep Request message.

An Initial-Sleep Window value represents a start value requested for the sleep interval (measured in frames), and a Final-Sleep Window value represents a stop value requested for the sleep interval (measured in frames). That is, as described with reference to the Sleep Interval Update Algorithm, the sleep interval can be updated within a range between the Initial-Sleep Window value and the Final-Sleep Window value.

Herein, the listening interval represents a requested listening interval (measured in frames). The listening interval can also be represented by the number of frames.

(2) Sleep Response (SLP_RSP) Message

The Sleep Response message is a message responsive to the Sleep Request message. The Sleep Response message can be used as a message indicating whether to approve a state transition request to the sleep mode from the MSS, or can be used as a message indicating an unsolicited instruction. The Sleep Response message includes information elements required by the MSS to operate in the sleep mode. A format of the Sleep Response message is illustrated in Table 3.

Request message to the BS according to a condition, or waits for a Sleep Response message indicating an unsolicited instruction from the BS. For Sleep-Approved value=1, the Sleep Response message includes a Start-Frame value, an Initial-Sleep Window value, and a Final-Sleep Window value. For Sleep-Approved value=0, the Sleep Response message includes a Request-Action (REQ-Action) value and a Request-Duration (REQ-Duration) value.

The Start-Frame value is a frame value until the MSS enters a first sleep interval, excluding the frame in which the Sleep Response message has been received. That is, the MSS state transitions to the sleep mode after expiration of the frames corresponding to the start frame value from the next frame of the frame where the Sleep Response message has been received.

As described above, the Initial-Sleep Window value represents a start value for the sleep interval (measured in frames), and the Final-Sleep Window value represents a stop value for the sleep interval (measured in frames). The REQ-Action value represents an action that should be taken by the MSS, a transition request to the sleep mode from which was defined.

(3) Traffic Indication (TRF_IND) Message

The traffic indication message is transmitted from a BS to a MSS during the listening interval, and indicates the pres-

TABLE 3

| SYNTAX | SIZE | NOTES |
| --- | --- | --- |
| SLP-RSP_MESSAGE_FORMAT( ) { | | |
| MANAGEMENT MESSAGE TYPE = 46 | 8 bits | |
| SLEEP-APPROVED | 1 bit | 0: SLEEP-MODE REQUEST DENIED<br>1: SLEEP-MODE REQUEST APPROVED |
| IF(SLEEP-APPROVED == 0) { | | |
| After-REQ action | 3 bit | 000: The MSS may retransmit the MOB_SLPREQ message at any time<br>001: The MSS shall retransmit the MOB_SLPREQ message after the time duration (REQduration) given by the BS in this message<br>010: The MSS shall not retransmit the MOB_SLP-REQ message and wait the MOB_SLP-RSP message from the BS<br>011:111: Reserved |
| REQ-duration | 4 bit | Time duration for case where After-REQ-action value is 001. |
| ) ELSE ( | | |
| START-Frame | 7 bits | |
| INITIAL-SLEEP WINDOW | 6 bits | |
| FINAL-SLEEP WINDOW | 10 bits | |
| } | | |
| } | | |

The Sleep Response message is also a dedicated message transmitted to the BS, according to information identified by the Basic CID of a MSS. The information elements of the Sleep Response message illustrated in Table 3 will be described below.

Management Message Type is information indicating a type of a current transmission message, and Management Message Type=46 represents the Sleep Response message.

A Sleep-Approved value is expressed with 1 bit. Sleep-Approved value=0 indicates that a state transition request to the sleep mode is defined (Sleep-Mode Request Denied), and Sleep-Approved value=1 indicates that a state transition request to the sleep mode is approved (Sleep-Mode Requested Approved). That is, Sleep-Approved value=0 indicates that a state transition request to the sleep mode by the MSS is denied. In this case, the denied MSS transmits a Sleep ence of packet data to be transmitted from the BS to the MSS. A format of the traffic indication message is illustrated in Table 4.

TABLE 4

| SYNTAX | SIZE | NOTES |
| --- | --- | --- |
| TRF-IND_MESSAGE_FORMAT( ) { | | |
| MANAGEMENT MESSAGE TYPE = 47 | 8 bits | |
| POSITIVE_INDICATION_LIST( ) { | | TRAFFIC HAS BEEN ADDRESSED |
| NUM-POSITIVE | 8 bits | |
| for (i=0; i<num-positive; i++) { | | |
| CID | 16 bits | BASIC CID OF THE MSS |

TABLE 4-continued

| SYNTAX | SIZE | NOTES |
|---|---|---|
| } | | |
| } | | |
| } | | |

The traffic indication message, unlike the Sleep Request message and Sleep Response message, is a broadcasting message that is transmitted on a broadcasting basis. In addition, the traffic indication message is a message indicating the presence of packet data to be transmitted from the BS to a particular MSS, and the MSS determines if it will state transition to the awake mode or remain in the sleep mode after decoding the broadcasted traffic indication message for the listening interval.

If the MSS state transitions to the awake mode, the MSS detects frame synchronization. If an expected frame sequence number is not detected, the MSS can request retransmission of lost packet data in the awake mode. However, if the MSS fails to receive the traffic indication message for the listening interval or a positive indication is not included in the traffic indication message even though the traffic indication message is received, the MSS returns to the sleep mode.

A description will now be made of information elements of the traffic indication message illustrated in Table 4.

Management Message Type is information indicating a type of a current transmission message, and Management Message Type=47 represents the traffic indication message. Positive_Indication_List includes Num-Positive indicating the number of positive subscribers and CIDs of the positive subscribers. That is, the Positive_Indication_List represents the number of MSSs to which packet data is to be transmitted, and CIDs thereof.

Transitioning

FIG. 3 is a signaling diagram illustrating a process of state transitioning to an awake mode by a MSS under the control of a BS in the IEEE 802.16e communication system. Referring to FIG. 3, an MSS 300 arrives at a listening interval at Step 311. If there is traffic, or packet data, to be transmitted to the MSS 300, a BS 350 buffers the packet data, and transmits a traffic indication message to the MSS 300 at Step 313.

Here, the traffic indication message includes the information elements described in connection with Table 4. The MSS 300 receiving the traffic indication message from the BS 350 determines if there is the positive indication in the traffic indication message. If there is the positive indication, the MSS 300 reads a Basic CID included in the traffic indication message and determines if its own Basic CID is included in the traffic indication message. If it is determined that its own Basic CID is included in the traffic indication message, the MSS 300 state transitions from the current mode, i.e., the sleep mode, to the awake mode at Step 315.

FIG. 4 is a signaling diagram illustrating a process of state transitioning to a sleep mode and maintaining the sleep mode by an MSS under the control of a BS in the IEEE 802.16e communication system. In FIG. 4, the MSS receives the traffic indication message for the listening interval, and then returns to the sleep mode according to a condition. In this case, if there is downlink traffic to be transmitted to several MSSs in the sleep mode state, the BS buffers the traffic for the MSSs, and includes Basic CIDs designating the corresponding MSSs in a periodically transmitted BS traffic indication message, before transmission on a broadcasting basis when the MSSs arrive at the listening interval.

Referring to FIG. 4, if a MSS 400 awaken in a listening interval 411 at Step 411, and receives a traffic indication message from a BS 450 at Step 413, the MSS 400 determines if its own Basic CID is included in the received traffic indication message. Here, because the MSS 400 fails to detect its own Basic CID from the BS traffic indication message, the MSS 400 continuously determines for the listening interval if its own Basic CID is included in received BS traffic indication messages 415 and 417. The MSS 400 continuously repeats the above process for the listening interval. If the MSS 400 stays in the Negative Basic CID state until the listening interval expires at Step 419, the MSS 400 returns to the sleep mode at Step 421.

As described above, the MSS 400 maintains the sleep mode for a doubled sleep interval, and then repeats the above process when it arrives again at the listening interval. However, if the MSS 400 detects a Positive Basic CID, the MSS 400 state transitions to the awake mode as described in connection with FIG. 3.

FIG. 5 is a diagram illustrating an operation of updating a sleep interval in a sleep mode by an MSS under the control of a BS in the IEEE 802.16e communication system. In FIG. 5, an MSS 570 receives a traffic indication messages transmitted by a BS 501 on a broadcasting basis for listening intervals 543, 547, and 551, and when Negative Basic CIDs 519, 529, and 539 are included in the received traffic indication messages, the MSS 570 doubles the sleep intervals 541, 545, and 549, and then returns to the sleep mode. If the MSS 570 detects a Positive Basic CID for the listening intervals 543, 547, and 551, the MSS 570 state transitions to the awake mode as described in conjunction with FIG. 3.

A format of the traffic indication message transmitted by the BS on a broadcasting basis to enable the MSS to state transition to the awake mode for the listening interval is illustrated in FIG. 6.

FIG. 6 is a diagram illustrating a format of a traffic indication message transmitted from a BS to a MSS in the IEEE 802.16e communication system. Referring to FIG. 6, a traffic indication message 600 includes MAC frame header parts 611 and 613 indicating that a corresponding transmission message is a traffic indication message, and traffic indication index parts 615, 617, and 619 indicating the contents of an actual traffic indication message.

The MAC frame header parts 611 and 613 include a Management Message Type field 611 indicating a type of the transmission message and a Num-of-Positive field 613 indicating a length of a traffic indication message. Herein, because the message is a traffic indication message, a value of 47 is stored in the Management Message Type field 611.

To enable three MSSs to simultaneously state transition to the awake mode through the traffic indication message 600, it is necessary to make CIDs for the three MSSs with traffic indication indexes. Therefore, in order to instruct the three MSSs to make a state transition to the awake mode, a value of 3 is stored in the Num-of-Positive field 613 and Basic CIDs for the three MSSs are included in the next fields before being transmitted. For example, in order to instruct first to third MSSs (MSS#1, MSS#2, and MSS#3) 621, 623, and 625 to state transition to the awake mode, Basic CIDs 615, 617, and 619 for the MSSs should be stored. Because the Basic CID includes 16 bits, or 2 bytes, a 6-byte data field is needed to instruct three MSSs to state transition to the awake mode.

As described above, the traffic indication message 600 is a broadcasting message, and all MSSs in their listening interval among the MSSs belonging to a particular BS receive the traffic indication message 600. The MSSs determine if their own Basic CIDs are included in the traffic indication message 600, to thereby determine whether they will maintain the sleep mode or make a state transition to the awake mode.

Above, a description has been made of the sleep mode operations proposed in the current IEEE 802.16e communication system. Next, a description will be made of problems of the sleep mode operations.

(1) In the IEEE 802.16e communication system, if there is traffic to be transmitted to MSSs in the sleep mode, the BS includes 16-bit Basic CIDs designating the corresponding MSSs in the traffic indication message as described above. However, a range of Basic CIDs designating MSSs in one BS occupies a very small part of CID#1 to CID#m among a total of 65536 CIDs. Therefore, 16-bit CIDs necessary for identifying MSSs include unnecessary most significant bits (MSBs).

As the number of MSSs that can be managed by the BS increases, the number of Basic CIDs that can be included in the traffic indication message in the above-described method also increases according thereto. For example, if the number of MSSs that can be managed by one BS is 30, only 5 bits are needed in indicating all of the MSSs. However, the conventional IEEE 802.16e communication system uses 16-bit CIDs as usual. For this, the traffic indication message needs a Basic CID group of a maximum of 60 bytes (30×2 bytes), or 480 bits.

In addition, the IEEE 802.16e communication system needs a specific bandwidth in order to transmit a traffic indication message to the MSSs, and as the number of MSSs that can be managed by one BS increases, the maximum size of the traffic indication message also increases according thereto, causing an increase in the bandwidth in use. Therefore, in order to minimize an influence on the bandwidth for transmitting data traffic, Basic CIDs for enabling the MSSs in the sleep mode to make a state transition to the awake mode are separately transmitted with several traffic indication messages. As a result, the listening interval for which the MSS receives the traffic indication message is also increased, causing unnecessary power consumption.

(2) In the IEEE 802.16e communication system, a MSS in the sleep mode awakes for the listening interval and repeats a process of waiting for a traffic indication message transmitted by the BS and determining if there is a Basic CID indicating the MSS in the traffic indication message. That is, if the MSS fails to receive a traffic indication message for the listening interval or there is no Basic CID in the traffic indication message even though the traffic indication message is received, the MSS continues to perform the above process. Therefore, the BS is not required to compel even the MSS remaining in the listening interval to make a state transition to the awake mode based on service scheduling for which load balancing on all MSSs is taken into consideration. However, an MSS, which is not informed about the situation, waits for a traffic indication message, continuously and unnecessarily wasting its power until expiration of the listening interval. Accordingly, there is a demand for various algorithms for directing the MSS to return to the sleep mode before expiration of the listening interval, thereby minimizing power consumption.

SUMMARY OF THE INVENTION

It is, therefore, an object of the present invention to provide a method for modifying a message for reducing a size of a traffic indication message transmitted by a transmission side in a sleep mode control system for a BWA communication system.

It is another object of the present invention to provide a method for modifying a traffic indication message for directing a MSS, which is not required to wait for a traffic indication message, to state transition back to a sleep mode for a listening interval in a sleep mode control system for a BWA communication system.

In accordance with an object of the present invention, there is provided a system for transmitting a traffic indication message in a Broadband Wireless Access communication system. The system includes a base station (BS) for transmitting the traffic indication message to mobile subscriber stations (MSSs). The traffic indication message includes information on a number of MSS groups and information on a number of traffic indication indexes, each of the MSS groups includes a predetermined number of MSSs, and each of the traffic indication indexes is assigned to each of the MSS groups, and includes a bitmap including a predetermined number of bits. The predetermined number of bits is identical to the number of the MSSs included in each of the MSS groups, and each of the predetermined number of the bits is assigned to each of the MSSs included in each of the MSS groups, and represents operation instruction information for each of the MSSs. At least one of the predetermined number of bits indicates that a corresponding MSS immediately state transitions to a sleep mode, without waiting for reception of a next traffic indication message for a listening interval.

In accordance with another object of the present invention, there is provided a system for receiving a traffic indication message in a Broadband Wireless Access communication system. The system includes a mobile subscriber station (MSS) for receiving the traffic indication message from a base station (BS). The traffic indication message includes information on a number of MSS groups and information on a number of traffic indication indexes, each of the MSS groups includes a predetermined number of MSSs, and each of the traffic indication indexes is assigned to each of the MSS groups, and includes a bitmap including a predetermined number of bits. The predetermined number of bits is identical to the number of the MSSs included in each of the MSS groups, and each of the predetermined number of bits is assigned to each of the MSSs included in each of the MSS groups and represents operation instruction information for each of the MSSs. At least one of the predetermined number of bits indicates that a corresponding MSS immediately state transitions to a sleep mode, without waiting for reception of a next traffic indication message for a listening interval.

In accordance with another object of the present invention, there is provided a method for transmitting a traffic indication message by a base station (BS) in a Broadband Wireless Access communication system. The method includes transmitting the traffic indication message to mobile subscriber stations (MSSs). The traffic indication message includes information on a number of MSS groups and information on a number of traffic indication indexes, each of the MSS groups includes a predetermined number of MSSs, and each of the traffic indication indexes is assigned to each of the MSS groups, and includes a bitmap including a predetermined number of bits. The predetermined number of bits is identical to the number of the MSSs included in each of the MSS groups, and each of the predetermined number of bits is assigned to each of the MSSs included in each of the MSS groups and represents operation instruction information for each of the MSSs. At least one of the predetermined number of bits indicates that a corresponding MSS immediately state transitions to a sleep mode, without waiting for reception of a next traffic indication message for a listening interval.

In accordance with another object of the present invention, there is provided a method for receiving a traffic indication message by a mobile subscriber station (MSS) in a Broadband Wireless Access communication system. The method includes receiving the traffic indication message from a base station (BS). The traffic indication message includes information on a number of MSS groups and information on a number of traffic indication indexes, each of the MSS groups includes a predetermined number of MSSs, and each of the traffic indication indexes is assigned to each of the MSS groups, and includes a bitmap including a predetermined number of bits. The predetermined number of bits is identical to the number of the MSSs included in each of the MSS groups, and each of the predetermined number of bits is assigned to each of the MSSs included in each of the MSS groups and represents operation instruction information for each of the MSSs. At least one of the predetermined number of bits indicates that a corresponding MSS immediately state transitions to a sleep mode, without waiting for reception of a next traffic indication message for a listening interval.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
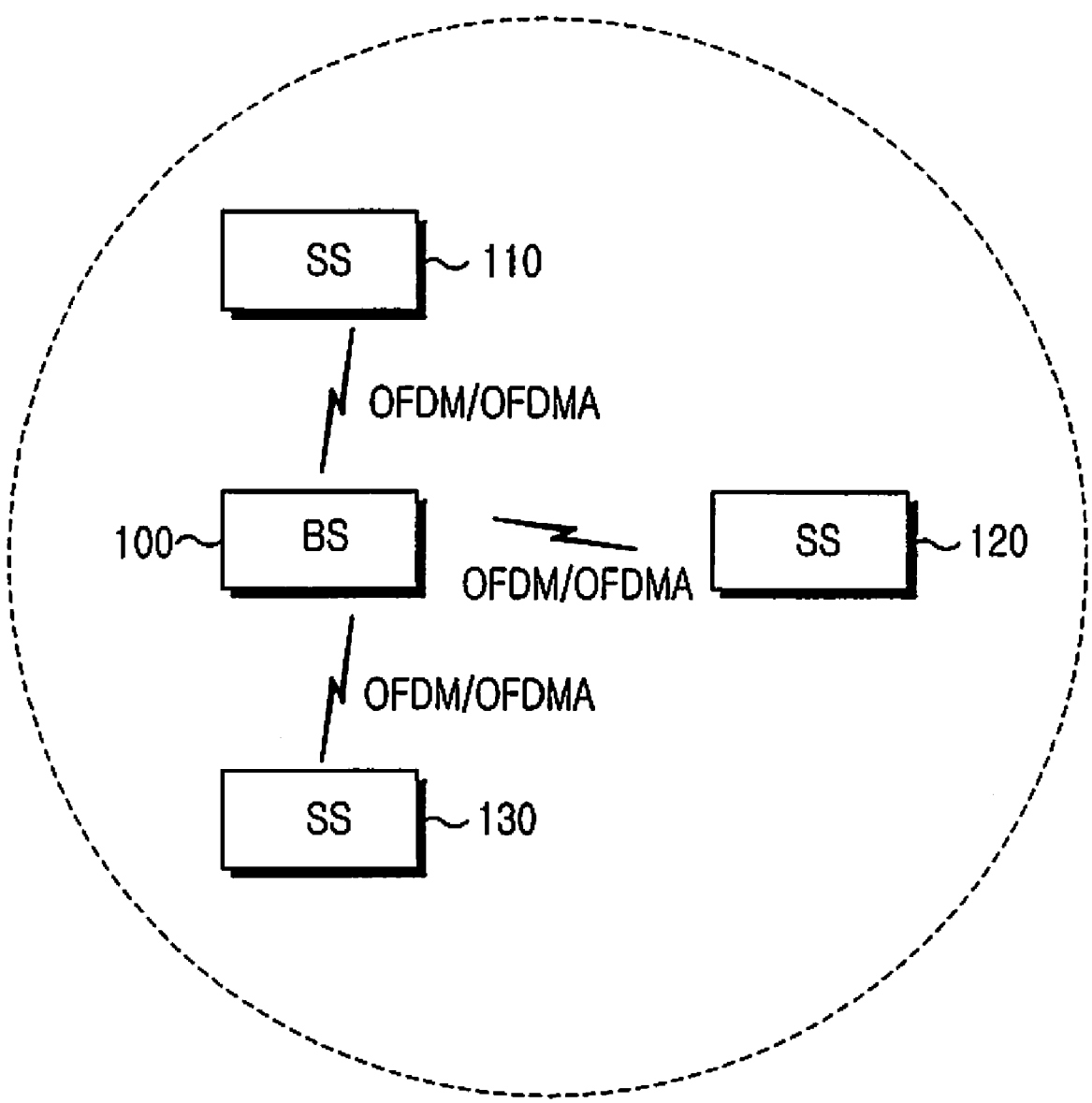
FIG. 1 is a diagram schematically illustrating a configuration of a Broadband Wireless Access (BWA) communication system using an Orthogonal Frequency Division Multiplexing (OFDM)/Orthogonal Frequency Division Multiple Access (OFDMA)
Figure 2:
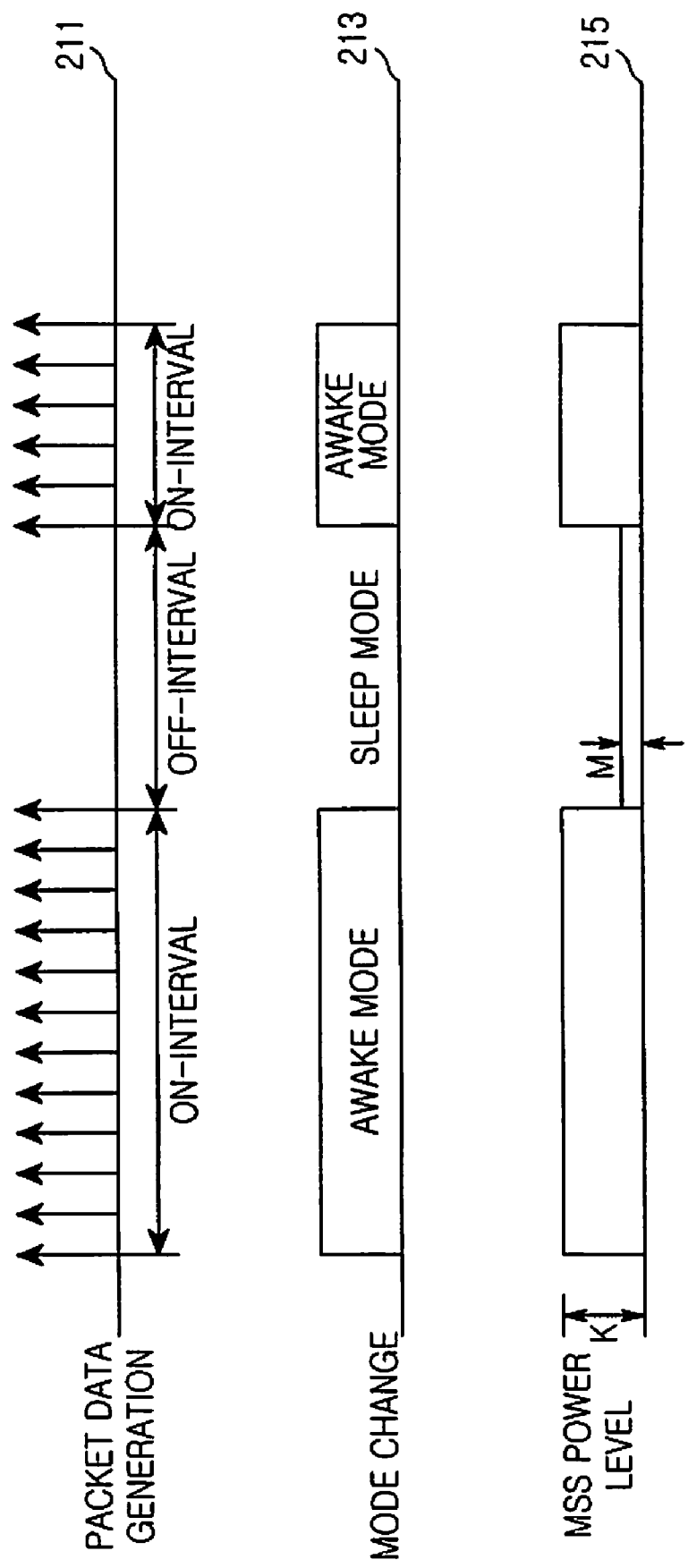
FIG. 2 is a diagram schematically illustrating a sleep mode operation proposed in the IEEE 802.16e communication system.
Figure 3:
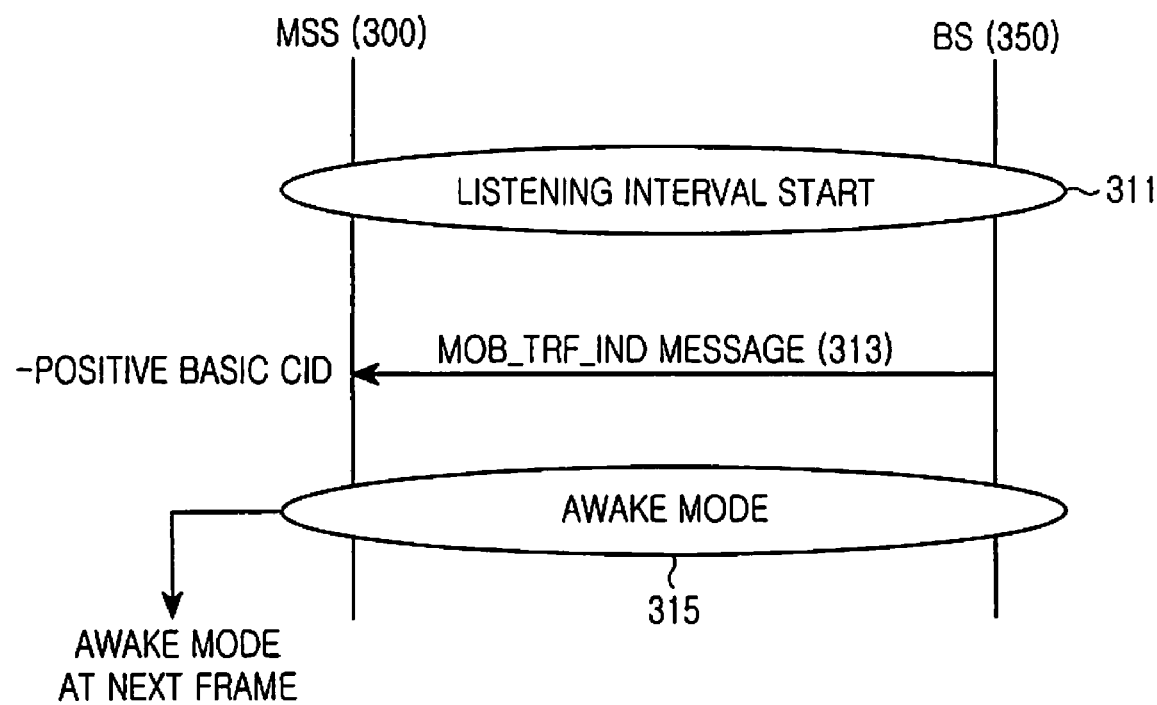
FIG. 3 is a signaling diagram illustrating a process of state transitioning to an awake mode by an MSS under the control of a BS in the IEEE 802.16e communication system.
Figure 4:
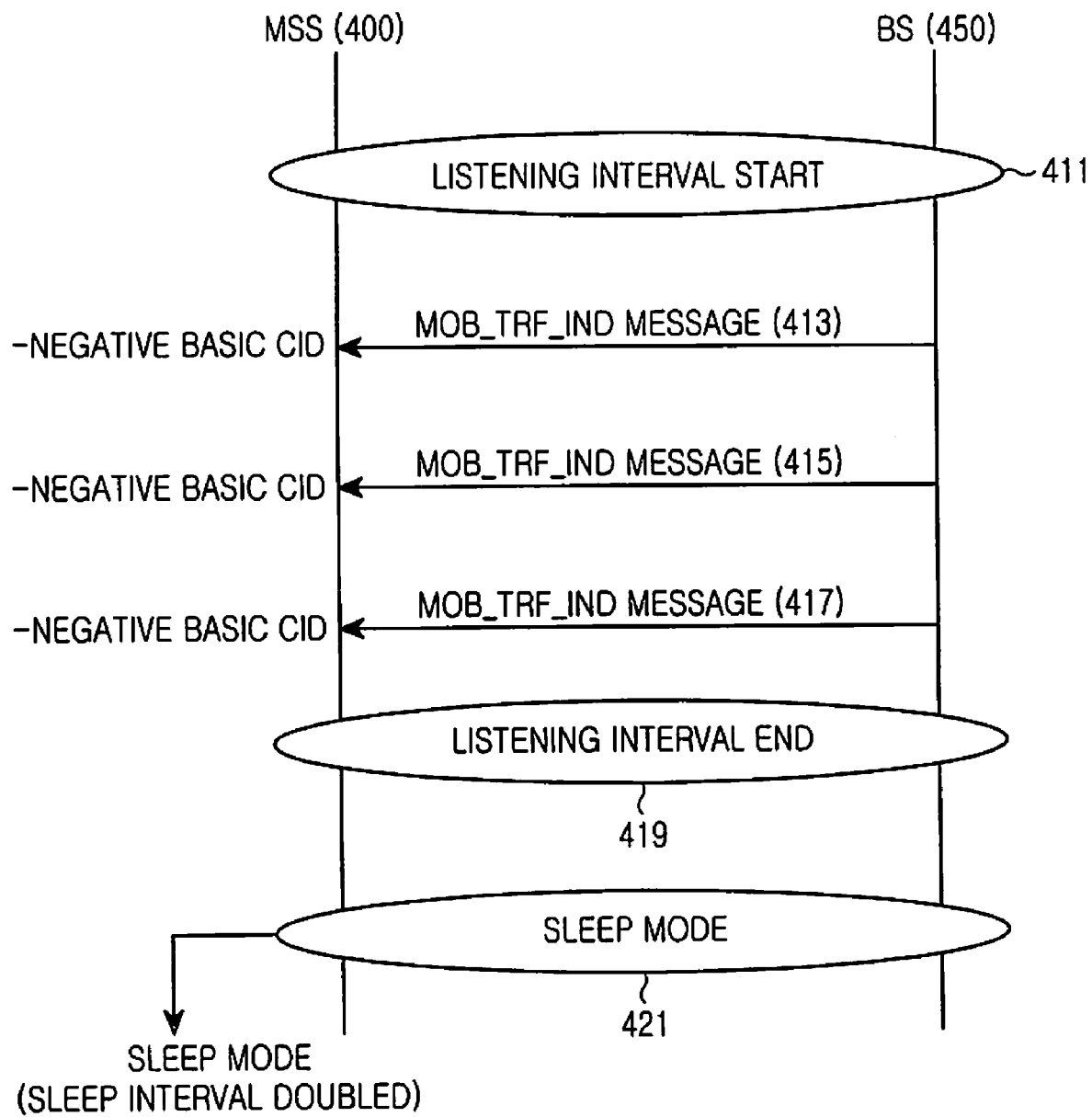
FIG. 4 is a signaling diagram illustrating a process of maintaining a sleep mode by an MSS in the IEEE 802.16e communication system.
Figure 5:
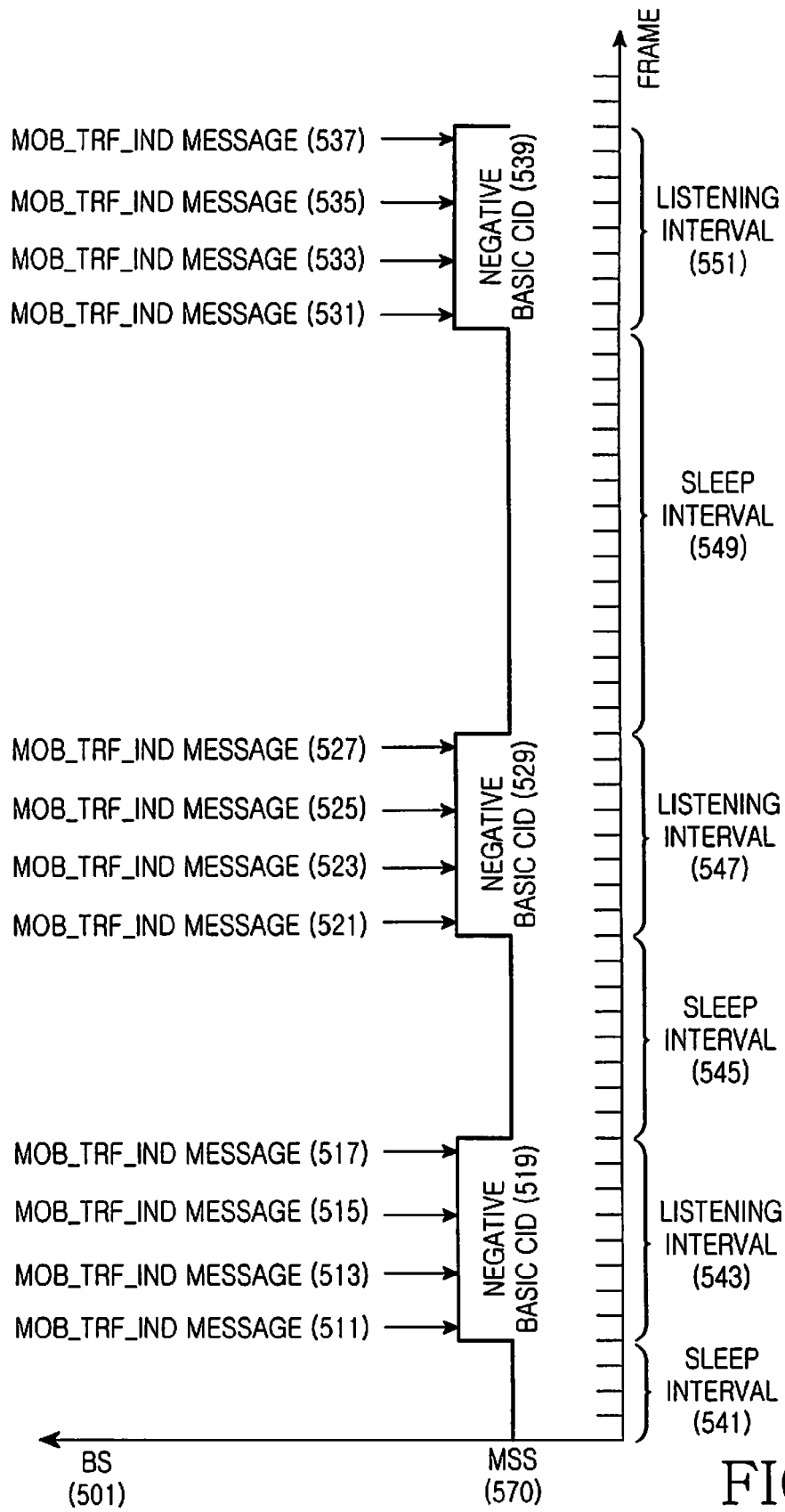
FIG. 5 is a diagram illustrating a sleep mode operation of an MSS in the IEEE 802.16e communication system.
Figure 6:
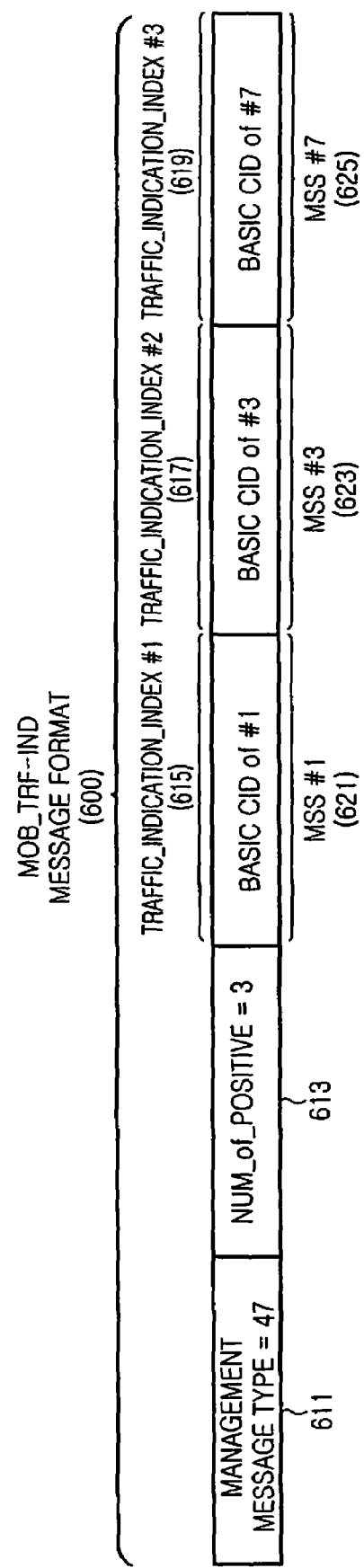
FIG. 6 is a diagram illustrating a traffic indication message transmitted from a BS to an MSS in the IEEE 802.16e communication system.

Several preferred embodiments of the present invention will now be described in detail herein below with reference to the annexed drawings. In the following description, a detailed description of known functions and configurations incorporated herein has been omitted for conciseness.

The present invention provides a method for making an efficient traffic indication message for directing an MSS in a sleep mode to state transition to an awake mode, thereby reducing unnecessary data transmission and performing effective mode control on the MSS.

As described above, because the IEEE 802.16e communication system should consider mobility of subscriber stations in the IEEE 802.16a communication system, power consumption of the MSSs is an important factor of the entire system. Therefore, a sleep mode operation and an awake mode operation between the BS and the MSSs have been proposed to minimize the power consumption of the MSSs. However, because the sleep mode operation and the awake mode operation proposed in the current IEEE 802.16e communication system have the problems described above, the present invention proposes embodiments for solving the above and other problems.

First Embodiment

A traffic indication message generation method according to a first embodiment of the present invention maps of Basic CIDs designating MSSs to traffic indication indexes with a bitmap structure. That is, the traffic indication message generation method according to the first embodiment is a first method for reducing a size of the traffic indication message, and proposes a method of using traffic indication indexes with a bitmap structure instead of the Basic CIDs designating the MSSs.

Therefore, the first embodiment of the present invention proposes a method for mapping traffic indication indexes with a bitmap structure instead of a series of 16-bit Basic CIDs, used in a traffic indication message.

The traffic indication message includes parameters, or information elements (IEs), configured in a bitmap structure, based on which the MSS should determine for its listening interval whether the BS has traffic to be transmitted to the corresponding MSS. A format of the traffic indication message is illustrated in Table 5.

TABLE 5

| Syntax | size | Note |
|---|---|---|
| TRF-IND_Message_Format( ) { | | |
|     Management message type = 47 | 8 bit | |
|     NUM_of_MSS_Group<br>    ( 8 MSSs * N) | 8 bit | The Number of MSS Group which is composed of 8 MSSs |
|     For(i=0; i <<br>    NUM_of_MSS_Group; i++) { | | |

TABLE 5-continued

| Syntax | size | Note |
|---|---|---|
| Traffic_Indication_Index | 8 bit | the n-th bit, which is apart from end of NUM_of_MSS_Group, means Basic CID of "n + 8 * i" |
| } | | |
| } | | |

Referring to Table 5, the traffic indication message according to an embodiment of the present invention is similar in format to the traffic indication message illustrated in Table 4. However, the new traffic indication message has a series of traffic indication indexes with a bitmap structure instead of a series of 16-bit Basic CIDs. The Basic CID described above is a CID designating an MSS, and uses a value ranging between 1 and m. A mapping relation between the Basic CIDs described in connection with Table 1 and bit indexes newly proposed in the present invention is illustrated in Table 6.

TABLE 6

| CIDs | Value | Proposed Bit Index in MOB_TRF_IND |
|---|---|---|
| Ranging CID | 0x0000 | N/A |
| Basic CID | 1x0001 | $1^{st}$ bit index |
| | 2x0002 | $2^{nd}$ bit index |
| | ... | ... |
| | M | $m^{th}$ bit index |
| Primary Management CIDs | m + 1 | N/A |

In Table 6, 'm', which indicates the maximum number of Basic CIDs allocated by the BS, represents the number of MSSs that the BS can support.

For example, an MSS using a Basic CID of 'n' is mapped to an $n^{th}$ bit in a continuous traffic indication index, or a parameter, in the traffic indication message. That is, the MSS with a Basic CID=1 is mapped to a first bit in the traffic indication index in Table 5, and an MSS with a Basic CID=12 is mapped to a $12^{th}$ bit in a continuous 2-byte traffic indication index.

Information elements of the traffic indication message illustrated in Table 5 will be described herein below. Management Message Type is identical to the Management Message Type described in connection with Table 4. Therefore, a detailed description thereof will be omitted. The newly defined information elements of Num_of_MSS_Group and Traffic_Indication_Index will be described.

The Num_of_MSS_Group, a first parameter, which denotes the number of groups, each having 8 MSSs, and has a different input value according to the maximum number of MSSs supported by the BS. That is, because a range of the Num_of_MSS_Group includes one byte, it is possible to make a maximum of 255 MSS groups. Accordingly, it is possible to support a maximum of 2040 (=255 MSS groups×8 MSSs) MSSs. Because it is possible to include a maximum of 2040 MSSs with one byte as described above, it is possible to efficiently make a traffic indication message.

The Num_of_MSS_Group can be expressed as shown in Equation (2).

$$\text{Num\_of\_MSS\_Group} = \frac{\text{Num of MSSs}}{8} \quad (2)$$

If the maximum number of MSSs that can be managed by the BS is 20, the Num_of_MSS_Group included in a traffic indication message transmitted from the BS to the MSS becomes 3, considering a traffic indication index comprised of a bit field for 20 MSSs. Here, '3' is the number of groups capable of including 20 MSSs to accommodate a maximum of 24 MSSs by taking 3 times of 8 MSSs.

The Traffic_Indication_Index, a second parameter, is used to allocate one bit to each MSS, i.e., allocate one Traffic_Indication_Index bit to a Basic CID used for identifying a MSS such that corresponding MSSs awaken from the sleep mode for the listening interval determine if there is traffic to be received from the BS, based on the allocated bits.

Possible values of the Traffic_Indication_Index bit analyzed by the MSS are as follows.

'0': This bit value indicates that the BS has no data to be transmitted to a corresponding MSS awaken for the listening interval after expiration of the sleep interval. The MSS detecting this bit value should repeat a process of analyzing a corresponding bit while continuously waiting for a traffic indication message for the listening interval.

In addition, because this bit is a meaningless bit for an MSS in the sleep mode or the awake mode remaining in the sleep interval, i.e., because the corresponding MSSs do not decode a received traffic indication message, this bit is set to '0' before being transmitted. That is, the traffic indication message considers only an MSS in a sleep mode that determines if there is traffic from the BS, for the listening interval. Accordingly, it can be understood that the traffic indication message is identical in operation to the traffic indication message used in the sleep mode in the conventional IEEE 802.16e communication system. Finally, because a bit not allocated to the MSS, i.e., a bit other than the bits allocated to the MSSs that can be supported by the BS, is meaningless, it is set to '0'.

'1': This bit value indicates that the BS has data to be transmitted to a corresponding MSS awaked for the listening interval after expiration of the sleep interval. The MSS detecting this bit value should make a state transition to the awake mode and prepare to receive the traffic transmitted by the BS.

As a result, by using the traffic indication message proposed in Table 5, it is possible to support the same number of MSSs with data much less than the traffic indication message used in the conventional IEEE 802.16e communication system. For example, in Table 7, a comparison is made between the traffic indication message used in the conventional IEEE 802.16e communication system and the traffic indication message proposed in the present invention in terms of the amount of data needed according to the number of MSSs supported by the BS.

TABLE 7

| Num of MSS in BS | Previousl MOB_TRF-IND | Proposed MOB_TRF-IND |
|---|---|---|
| 1 | 2 byte in Max. | 1 byte |
| 2 | 4 byte in Max. | 1 byte |
| 4 | 8 byte in Max. | 1 byte |
| 8 | 16 byte in Max. | 1 byte |
| 16 | 32 byte in Max | 2 byte |
| 32 | 64 byte in Max | 4 byte |
| 64 | 128 byte in Max | 8 byte |
| 128 | 256 byte in Max | 16 byte |
| 256 | 512 byte in Max | 32 byte |
| 512 | 1024 byte in Max | 64 byte |

As illustrated in Table 7, it can be understood that as the number of MSSs supported by the BS increases, the traffic indication message proposed in Table 5 can perform the same function with data much less than the existing traffic indication message, for the data necessary for compelling a MSS in the listening interval to make a state transition to the awake mode.

Figure 7:
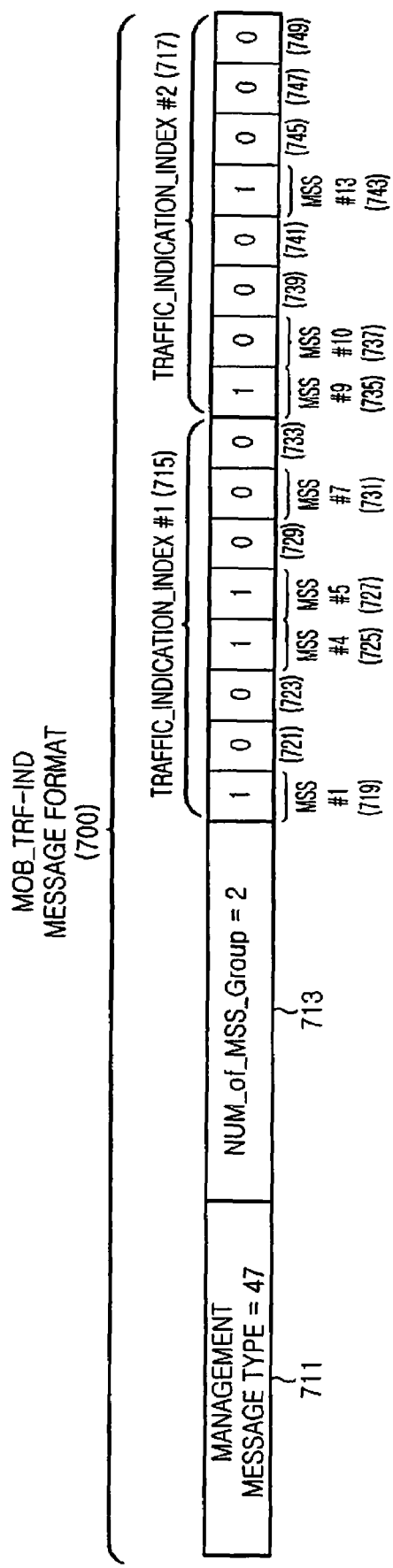
FIG. 7 is a diagram illustrating a traffic indication message transmitted from a BS to MSSs according to a first embodiment of the present invention.

FIG. 7 is a diagram illustrating a traffic indication message transmitted from a BS to MSSs in the IEEE 802.16e communication system according to a first embodiment of the present invention. Referring to FIG. 7, a corresponding traffic indication (MOB_TRF_IND) message 700 includes parameters of Management Message Type 711, Num_of_MSS_Group 713, and Traffic_Indication_Indexes 715 and 717. However, before a detailed description of FIG. 7 is given, it will be assumed herein that the maximum number of MSSs that can be managed by the BS is 14. Therefore, it is assumed that the MSSs have been allocated the Basic CIDs described above from 1 to 14. In addition, it is assumed that MSSs having 1, 4, 5, 7, 9, 10, and 13 as the Basic CIDs are staying in their listening intervals, and thus are waiting for the traffic indication message transmitted from the BS on a broadcasting basis.

In FIG. 7, the Management Message Type 711 indicates that the transmission message is a traffic indication message 700, and the Num_of_MSS_Group 713 is set to '2' in order to allow the BS to accommodate 14 MSSs according to the assumptions stated above. Therefore, two consecutive Traffic_Indication_Indexes 715 and 717 are used, and their respective bits are allocated to MSSs having 1 to 14 as the Basic CIDs on a one-to-one basis. On this assumption, because MSSs 719, 725, 727, 731, 735, 737, and 743 having 1, 4, 5, 7, 9, 10, and 13 as Basic CIDs, respectively, among all MSSs are staying in the listening interval, they wait for the traffic indication message 700. The MSSs 719, 725, 727, 731, 735, 737, and 743 read corresponding bit values from the Traffic_Indication_Indexes of the received traffic indication message.

For example, the MSS 719 having a Basic CID of 1 reads a value of an allocated first bit from the Traffic_Indication_Index 715. In this case, because the corresponding bit value is '1', the MSS 719 state transitions to the awake mode and receives traffic transmitted from the BS. Unlike this, the MSS 737 having a Basic CID of 10 reads a value of $10^{th}$ bit from the Traffic_Indication_Index 717. In this case, because the corresponding bit value is '0', the MSS 737 continuously waits for the traffic indication message 700 for the remaining listening interval, determining that there is data to be transmitted from the BS.

In FIG. 7, reference numerals 721, 723, 729, 733, 739, 741, and 745 represent absence of corresponding bits because the corresponding MSSs are in the awake mode or the sleep mode and have no data to be transmitted to the BS, as described with reference to the '0'-bit value in the Traffic_Indication_Index. In addition, reference numerals 747 and 749 represent meaningless bits set to '0' because they do not fall within a range of the number of MSSs that can be managed by the BS.

In FIG. 7, in order to direct the MSSs 719, 725, 727, 735, and 743 having Basic CIDs of 1, 4, 5, 9, and 13 to make a state transition to the awake mode for the listening interval, the traffic indication message proposed in the present invention has a size of a total of 4 bytes. However, in order to transmit a traffic indication message in the sleep mode in the conventional IEEE 802.16e communication system, it is necessary to group corresponding Basic CIDs 1, 4, 5, 9, and 13 of 16 bits (i.e., 2 bytes) and insert them into the traffic indication message. Therefore, a total of 12 (=1+1+2*5) bytes are needed. As a result, it is easy to control MSSs in the sleep mode at a time using the traffic indication message 700 proposed in the present invention.

With reference to FIG. 7, a description has been made of an operation of state transitioning to the awake mode or continuously waiting for a traffic indication message by a corresponding MSS for the listening interval using the traffic indication message proposed in the present invention.

In the method according to the first embodiment of the present invention, when there is no traffic for an MSS in a listening interval, the traffic indication message for traffic transmission in the conventional IEEE 802.16e communication system is comprised of 2 bytes by setting Num-Positive (indicating the number of positive subscribers) illustrated in Table 4 to '0'. However, in the present invention, because Traffic_Indication_Indexes having bits for all MSSs are always included, as the number of MSSs managed by the BS increases, a traffic indication message longer than the conventional traffic indication message can be transmitted to the MSSs. In order to solve this problem, the present invention can use the following modified method to use a traffic indication message having a dynamically variable length instead of a traffic indication message with a fixed size.

When the BS has no traffic to be transmitted to all corresponding MSSs in the listening interval, the BS sets the Num_of_MSS_Group to '0' and transmits the traffic indication message with no Traffic_Indication_Indexes attached to and end thereof. The corresponding MSS receiving the traffic indication message determines if there is a bit designating the MSS itself in the Traffic_Indication_Indexes, using the Num_of_MSS_Group. If there is no bit designating the MSS itself, the MSS determines that there is no data to be received. That is, as described above, the MSS waits for the next traffic indication message until expiration of the listening interval, determining that a bit allocated to the Traffic_Indication_Indexes for the corresponding MSS is '0'.

The BS determines a Basic CID having the largest value among corresponding MSSs to be directed to state transition to the awake mode in a frame interval for which a traffic indication message will be transmitted, i.e., the corresponding listening interval. Thereafter, the BS sets the Basic CID to the Num_of_MSS_Group value including the Traffic_Indication_Index bits mapped on a one-to-one basis. Thereafter, the BS generates a traffic indication message by attaching thereto Traffic_Indication_Indexes in a bitmap format having a size corresponding to the Num_of_MSS_Group. For the Traffic_Indication_Indexes, the BS sets a bit designating a Basic CID of a corresponding MSS to be directed to state transition to the awake mode, to '1'. Thereafter, the BS transmits the generated traffic indication message to the MSS remaining in the listening interval on a broadcasting basis.

The corresponding MSS receiving the traffic indication message determines if there is a bit designating the MSS itself in the Traffic_Indication_Indexes, using the Num_of_MSS_Group. If there is no bit designating the MSS itself, the MSS determines that there is no data to be received. That is, as described above, the MSS waits for the next traffic indication message until expiration of the listening interval, determining that a bit allocated to the Traffic_Indication_Indexes for the corresponding MSS is '0'. However, if the corresponding bit exists, the MSS operates in the method described with reference to the traffic indication message with a fixed length.

In order to use a traffic indication message having a dynamically variable length, for the Traffic_Indication_Indexes with a bitmap structure of the traffic indication message, the MSS is mapped to a Basic CID allocated from the BS on a one-to-one basis as described above. Therefore, in order to minimize a size of the traffic indication message, it is preferable for the BS to sequentially allocate Basic CIDs to the MSSs.

Figure 8:
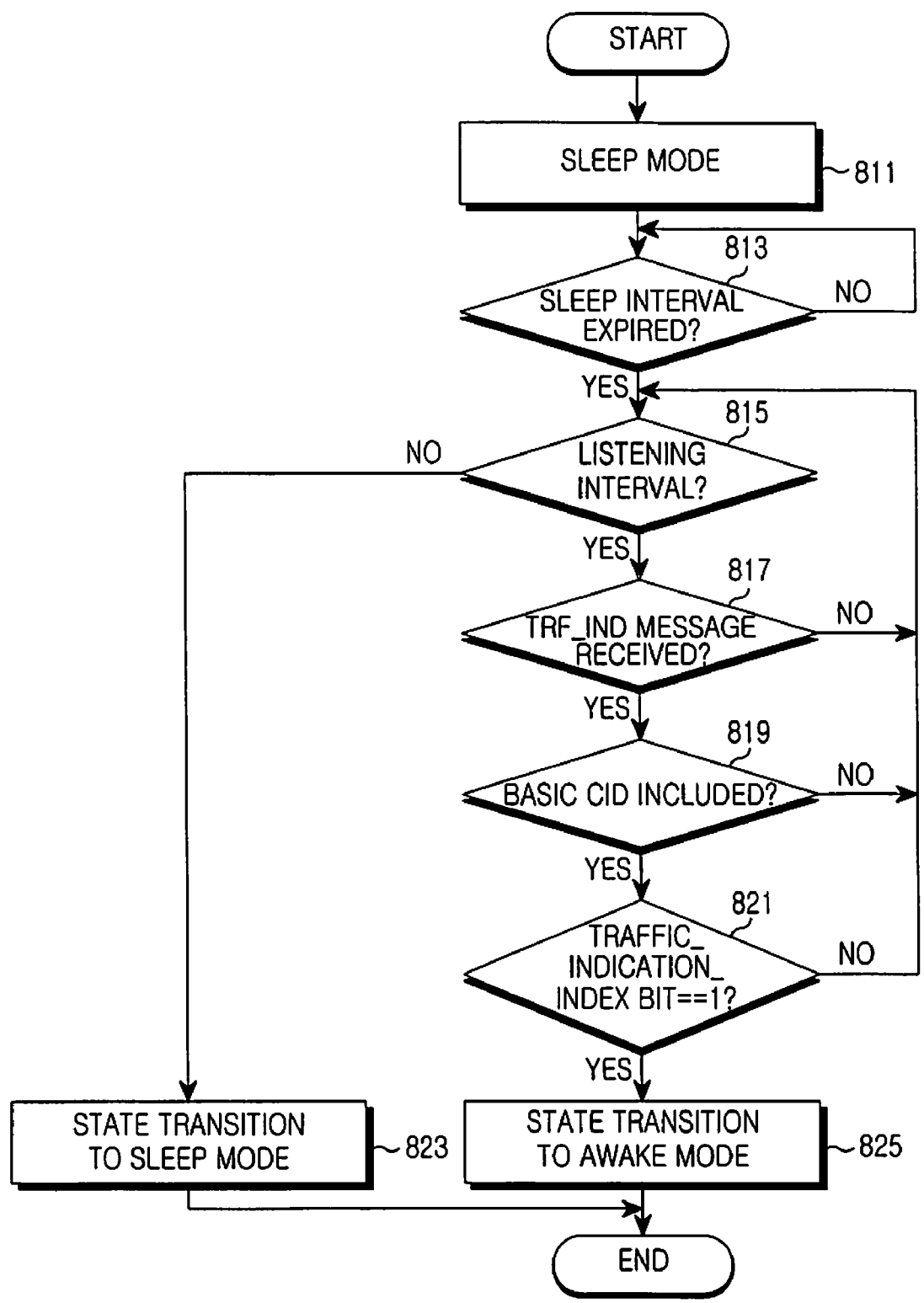
FIG. 8 is a flowchart illustrating a process of state transitioning by an MSS using a traffic indication message according to the first embodiment of the present invention.

FIG. 8 is a flowchart illustrating a process of state transitioning by a MSS upon receiving a traffic indication message according to a first embodiment of the present invention. Referring to FIG. 8, an MSS is in a sleep mode at step 811. In step 813, the MSS determines if it is in a sleep interval, i.e., whether it should remain in the sleep mode. If it is determined that the sleep interval has expired, the MSS proceeds to step 815. However, if it is determined that the sleep interval has not ended, the MSS returns to step 813.

In step 815, the MSS determines if it is in a listening interval, i.e., whether the listening interval has expired. If it is determined that the listening interval has expired, the MSS proceeds to step 823 where it state transitions to the sleep mode. However, if it is determined in step 815 that the listening interval has not expired, the MSS proceeds to step 817.

In step 817, the MSS determines if a traffic indication message is received from a BS for the listening interval. If it is determined that a traffic indication message is received, the MSS proceeds to step 819. However, if it is determined in step 817 that no traffic indication message is received, the MSS returns to step 815.

In step 819, the MSS determines if there is a Traffic_Indication_Index bit described with reference to Table 6, being mapped to its own Basic CID, based on Num_of_MSS_Group included in the received traffic indication message. This means that the traffic indication message can have a variable traffic indication index. If it is determined that there is a corresponding Traffic_Indication_Index bit, the MSS proceeds to step 821. However, if it is determined in step 819 that there is no corresponding Traffic_Indication_Index bit, the MSS returns to step 815, considering that no traffic indication message is received.

With reference to FIG. 8, a description has been made of a procedure in which the MSS state transitions to the awake mode, waits for a traffic indication message, or state transitions to the sleep mode for the listening interval, using the traffic indication message proposed in the present invention.

The first embodiment has proposed a method for mapping a Basic CID allocated to the MSS to one bit in a traffic indication index with a bitmap structure on a one-to-one basis as a method for reducing a size of the traffic indication message. Next, a method according to a second embodiment of the present invention will be described.

Second Embodiment

A second embodiment of the present invention provides a method of using a Sleep ID (SLPID) designating an MSS in the sleep mode instead of a Basic CID of a traffic indication message used in the IEEE 802.16e communication system.

Conventionally, in order to direct an MSS operating in the sleep mode to state transition to the awake mode, the BS includes a Basic CID of the MSS in a traffic indication message. However, the second embodiment of the present invention proposes a method for identifying the MSS operating in the sleep mode using a newly defined Sleep ID instead of the Basic CID included in the traffic indication message.

For the proposed method, the second embodiment of the present invention newly defines the Sleep Response message of Table 3 and the traffic indication message of Table 4. A Sleep Response message newly defined in the second embodiment of the present invention is illustrated in Table 8.

TABLE 8

| SYNTAX | SIZE | NOTES |
|---|---|---|
| SLP-RSP_MESSAGE_FORMAT( ) { | | |
| MANAGEMENT MESSAGE TYPE = 46 | 8 bits | |
| SLEEP-APPROVED | 1 bit | 0: SLEEP-MODE REQUEST DENIED<br>1: SLEEP-MODE REQUEST APPROVED |
| IF(SLEEP-APPROVED == 0) { | | |
| After-REQ action | 3 bit | 000: The MSS may retransmit the MOB_SLPREQ message at any time<br>001: The MSS shall retransmit the MOB_SLPREQ message after the time duration (REQduration) given by the BS in this message<br>010: The MSS shall not retransmit the MOB_SLP-REQ message and wait the MOB_SLP-RSP message from the BS<br>011:111: Reserved |
| REQ-duration | 4 bit | Time duration for case where After-REQ-action value is 001. |
| } ELSE { | | |
| START-Frame | 7 bits | |
| INITIAL-SLEEP WINDOW | 6 bits | |
| FINAL-SLEEP WINDOW | 10 bits | |
| SLEEP ID | 8 bit | Identifier for MSS under Sleep Mode Operation |
| }<br>}<br>} | | |

In step 821, the MSS analyzes a Traffic_Indication_Index bit. If it is determined that the Traffic_Indication_Index bit is '1', the MSS proceeds to step 825 where it state transitions to the awake mode, determining that the BS has data to be transmitted to the MSS for the listening interval.

However, if it is determined in step 821 that the Traffic_Indication_Index bit is not '1', the MSS returns to step 815, determining that the BS has no data traffic for the corresponding MSS for the listening interval.

Referring to Table 8, the Sleep Response message proposed in the second embodiment is identical to the Sleep Response message illustrated in Table 3 in constituent parameters except the newly defined Sleep ID. Therefore, only the Sleep ID will be described herein, and a description of the other parameters will be omitted.

The Sleep ID is allocated through the Sleep Response message in a process in which the MSS state transitions to the sleep mode. The Sleep ID is uniquely used only for the MSSs operating in the sleep mode. That is, the Sleep ID is an ID used for identifying a MSS in the sleep mode state including the listening interval, and if the corresponding MSS state transitions to the awake mode, the Sleep ID in use is returned to the BS so that the Sleep ID can be reused by another MSSs desiring to make a state transition to the sleep mode, using the Sleep Response message illustrated in Table 8. The Sleep ID, when it has 8 bits, has a value ranging between 0 and 255. Therefore, the Sleep ID can support a maximum of 256 MSSs in sleep mode operation.

The traffic indication message according to the second embodiment of the present invention is illustrated in Table 9.

TABLE 9

| SYNTAX | SIZE | NOTES |
|---|---|---|
| TRF-IND_MESSAGE_FORMAT( ) { | | |
| MANAGEMENT MESSAGE TYPE = 47 | 8 bits | |
| POSITIVE_INDICATION_LIST( ) { | | TRAFFIC HAS BEEN ADDRESSED |
| NUM-POSITIVE | 8 bits | |
| for (i=0; i< NUM-POSITIVE; i++) { | | |
| Sleep ID | 8 bits | Identifier for MSS under Sleep Mode |
| } | | |
| } | | |
| } | | |

Referring to Table 9, the traffic indication message according to the second embodiment of the present invention is identical to the traffic indication message illustrated in Table 4 in constituent parameters, except for the newly defined Sleep ID. That is, the Sleep ID can be used instead of the Basic CID illustrated in Table 4. Therefore, a description of the parameters other than the Sleep ID will be omitted.

The Sleep ID is allocated to the MSS by the BS using the Sleep Response message of Table 8, and it is used in identifying only the MSS operating in the sleep mode as described with reference to Table 8. Although the Sleep ID, like the Basic CID of Table 4, is used for designating the MSS, the use of the Sleep ID is limited only to the MSS operating in the sleep mode. That is, the Sleep ID is allocated by the BS only to the MSS that state transitions to the sleep mode as described above. Therefore, the traffic indication message of Table 9 includes only a Sleep ID designating an MSS to be directed to state transition to the awake mode during the listening interval among the MSSs operating in the sleep mode.

Therefore, the Sleep ID included in the traffic indication message of Table 9 can be shorter in length than the Basic CID used in Table 4. For example, in Table 9, the Sleep ID has an 8-bit length, which is a half the size. Therefore, the proposed traffic indication message is two times higher in efficiency than the existing traffic indication message. That is, assuming the traffic indication messages have the same length, the traffic indication message proposed in the present invention is twice as large as the existing traffic indication message in number of IDs for the MSSs.

The entire sleep mode operation through the two messages described in connection with Table 8 and Table 9 is identical to the sleep mode operation in the conventional IEEE 802.16e communication system. However, in the second embodiment of the present invention, because an 8-bit Sleep ID for identifying only an MSS operating in the sleep mode is allocated to the conventional Sleep Response message transmitted to the MSS in the awake mode, the proposed Sleep Response message is twice as efficient in a message length than the conventional Sleep Response message.

An MSS allocated the Sleep ID, i.e., a MSS operating in the sleep mode, uses the corresponding Sleep ID over the sleep interval until it state transitions back to the awake mode.

The Sleep ID used by the MSS operating in the sleep mode is returned to the BS according to the following three events.

1) The Sleep ID is returned to the BS, when predetermined user data is first received from the MSS after directing the MSS in sleep mode operation to make a state transition to the awake mode through a traffic indication message from the BS for the listening interval.

2) The Sleep ID is returned to the BS, when a Bandwidth Request message for transmitting user data is transmitted from the MSS in sleep mode operation for the sleep interval.

3) The Sleep ID is returned to the BS, when an unexpected message is transmitted from the MSS in sleep mode operation for the sleep interval.

In a sleep mode operation in the IEEE 802.16e communication system, if the BS receives data from the MSS considering synchronization of sleep mode/awake mode states between the MSS and the BS, the Sleep ID allocated to the corresponding MSS in sleep mode operation is returned to be reused in the future.

Figure 9:
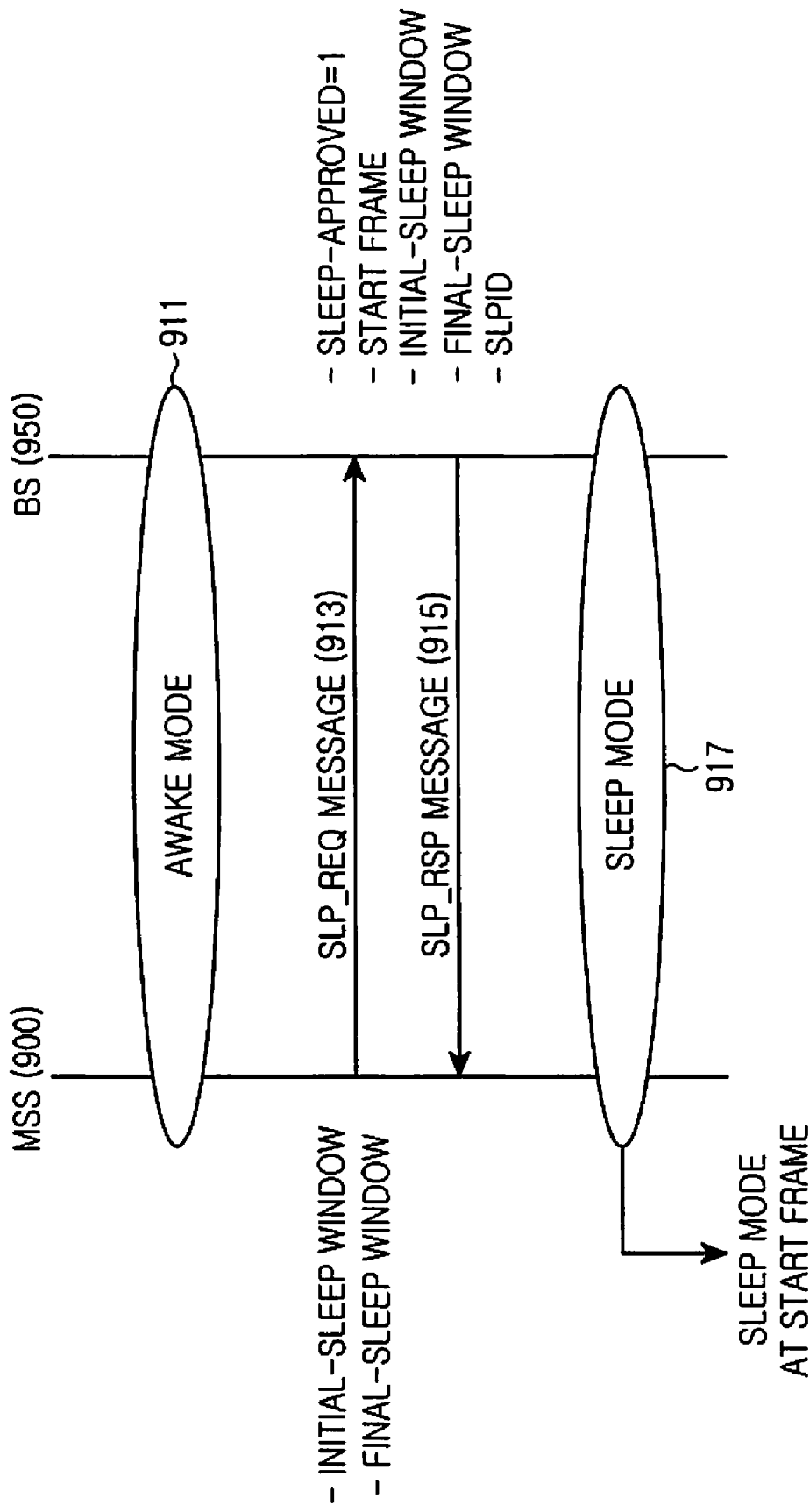
FIG. 9 is a signaling diagram illustrating a process of state transitioning to the sleep mode in response to a request from an MSS according to a second embodiment of the present invention.

FIG. 9 is a signaling diagram illustrating a process of state transitioning to the sleep mode in response to a request from an MSS according to the second embodiment of the present invention. Referring to FIG. 9, an MSS 900 is in the awake mode in step 911. If the MSS 900 desires to state transition to the sleep mode, it transmits a Sleep Request (SLP_REQ) message to a BS 950 in step 913. The BS 950 receiving the Sleep Request message from the MSS 900 determines whether to approve a state transition to the sleep mode of the MSS 900, based on situations of the MSS 900 and the BS 950. Based on the determination result, the BS 950 transmits a Sleep Response (SLP_RSP) message to the MSS 900 at Step 915. Here, the Sleep Response message includes the information elements described in connection with Table 8, and further includes a Sleep ID (SLPID) uniquely used by the MSS in the sleep mode according to the second embodiment of the present invention.

Herein, the BS 950 determines whether to approve a state transition to the sleep mode of the MSS 900, based on whether there is packet data to be transmitted to the MSS 900. As illustrated in Table 8, the BS 950 sets Sleep-Approved to '1' to approve the state transition to the sleep mode, and sets Sleep-Approved to '0' to deny the state transition to the sleep mode. The information elements included in the Sleep Response message have been described with reference to Table 8.

Subsequently, the MSS 900 receiving the Sleep Response message from the BS 950 analyzes a Sleep-Approved value included in the Sleep Response message, and state transitions to the sleep mode if the state transition to the sleep mode is approved at Step 917. As the MSS 900 state transitions to the sleep mode, it can perform a sleep mode operation by reading corresponding information elements from the Sleep Response message.

According to the second embodiment of the present invention, the MSS receives the Sleep ID instead of the Basic CID from the BS. Therefore, the corresponding MSS receiving the Sleep ID, when it receives a traffic indication message for the listening interval in the sleep mode, analyzes the received Sleep ID rather than analyzing the Basic CID.

Figure 10:
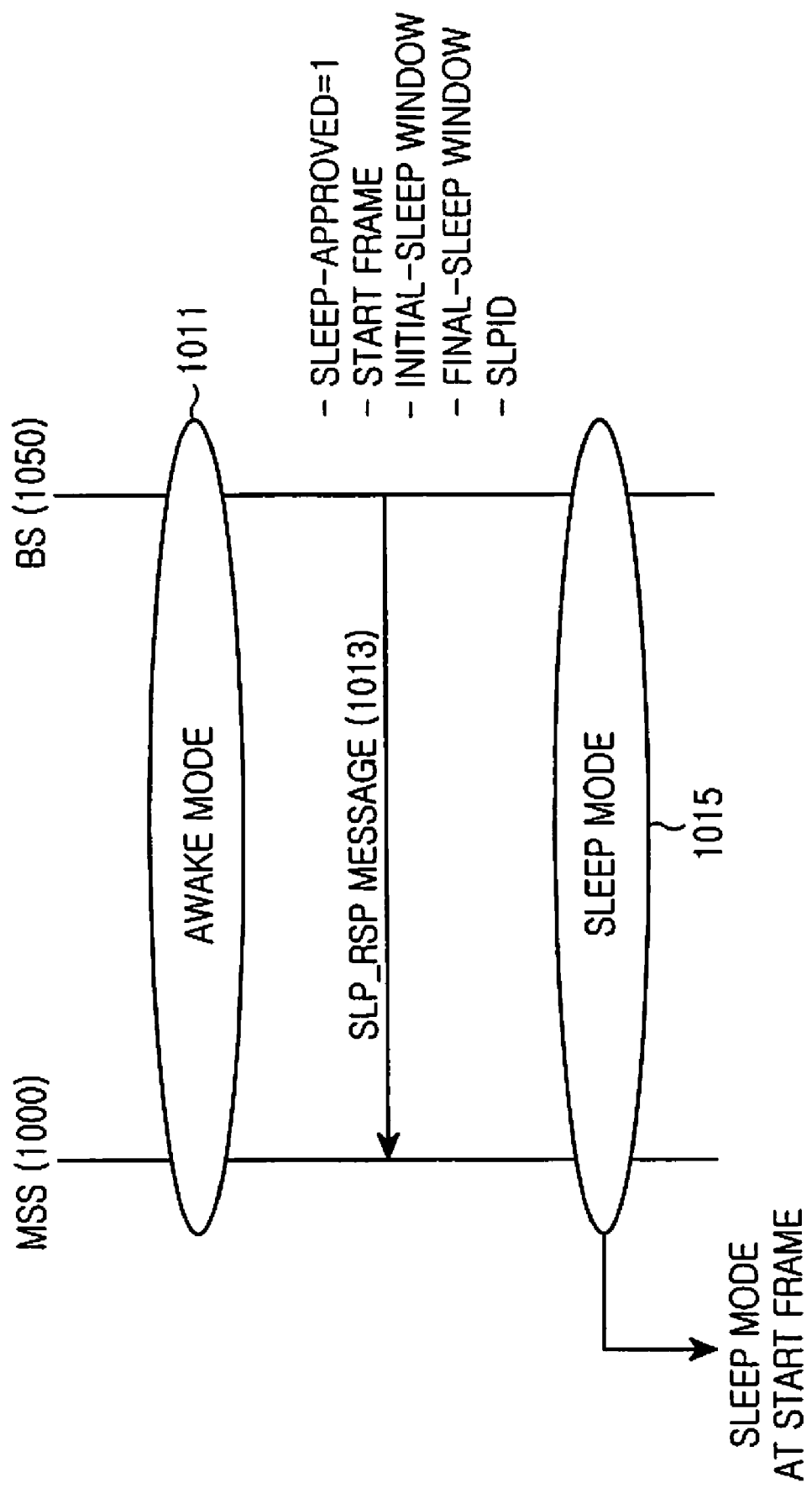
FIG. 10 is a signaling diagram illustrating a process of state transitioning to a sleep mode in response to a request from a BS according to the second embodiment of the present invention.

FIG. 10 is a signaling diagram illustrating a process of state transitioning to a sleep mode by an MSS under the control of a BS. However, before a description of FIG. 10 is given, it should be noted that the current IEEE 802.16e communication system proposes a scheme of using the Sleep Response message as a message indicating an unsolicited instruction. The term "unsolicited instruction" literally means that the MSS operates according to instruction, or control, of the BS even though there is no separate request from the MSS. For example, in FIG. 10, the MSS state transitions to the sleep mode according to the unsolicited instruction.

Referring to FIG. 10, a BS 1050 transmits a Sleep Response (SLP_RSP) message to a MSS 1000 in the awake mode, at step 1011, at Step 1013. The Sleep Response message includes the information elements described with reference to Table 8, and further includes a Sleep ID (SLPID) uniquely used by the MSS 1000 in the sleep mode according to the second embodiment of the present invention. The MSS 1000 receiving the Sleep Response message from the BS 1050 analyzes a Sleep-Approved value included in the Sleep Response message, and state transitions to the sleep mode if a state transition to the sleep mode is approved at Step 1015.

In FIG. 10, because the Sleep Response message is used as an unsolicited instruction message, the Sleep-Approved value is set to only '1'. In addition, as the MSS 1000 state transitions to the sleep mode, it performs a sleep mode operation by reading corresponding information elements from the Sleep Response message.

As described with reference to FIG. 9, according to the second embodiment of the present invention, the MSS receives a Sleep ID rather than a Basic CID from the BS. Therefore, the corresponding MSS receiving the Sleep ID, when it receives a traffic indication message for the listening interval in the sleep mode, analyzes the received Sleep ID rather than analyzing the Basic CID.

Hereinafter, with reference to FIG. 11, an MSS using the received Sleep ID under the control of a BS will make a description of an operation of state transition to the awake mode.

Figure 11:
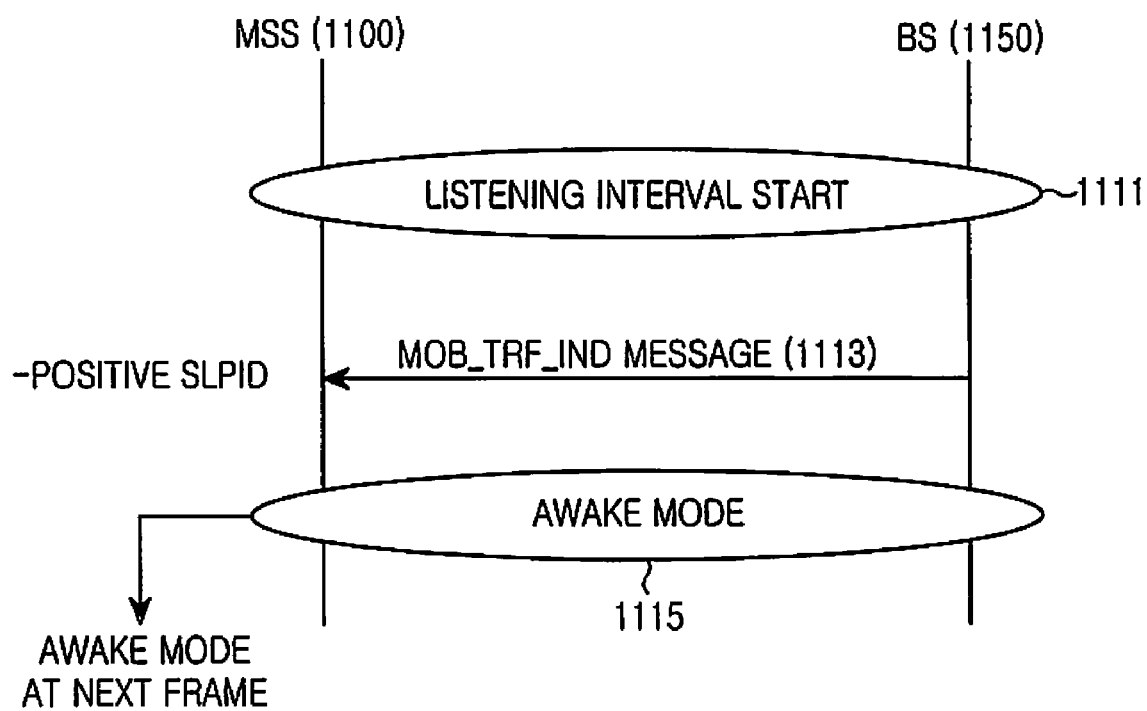
FIG. 11 is a signaling diagram illustrating a process of state transitioning to the awake mode by an MSS according to the second embodiment of the present invention.

FIG. 11 is a signaling diagram illustrating a process of state transitioning to the awake mode by a MSS under the control of a BS. Referring to FIG. 11, if a BS 1150 has traffic, or packet data, to be transmitted to a MSS 1100, it buffers the packet data. Thereafter, if the MSS 1100 arrives at a listening interval at step 1111, the BS 1150 transmits a traffic indication (MOB_TRF_IND) message to the MSS 1100 at Step 1113.

The traffic indication message includes the information elements described with reference to Table 9, and further includes a Sleep ID (SLPID) uniquely used by the MSS 1100 in the sleep mode according to the second embodiment of the present invention.

The MSS 1100 receiving the traffic indication message from the BS 1150 determines if there is Positive_Indication_List in the traffic indication message, and if there is Positive_Indication_List, the MSS 1100 reads Positive SLPID included in the traffic indication message and determines whether its own Sleep ID is included.

If it is determined that its own Sleep ID is included in the traffic indication message, the MSS 1100 state transitions from the current sleep mode to the awake mode at Step 1115.

The second embodiment of the present invention has proposed a method of using a Sleep ID designating an MSS in sleep mode operation instead of a Basic CID in the traffic indication message, as a method for reducing a size of the traffic indication message.

The first and second embodiments of the present invention have proposed a method for efficiently configuring a traffic indication message for directing an MSS in the sleep mode to state transition to the awake mode, reducing unnecessary data transmission, and performing effective mode control on the MSS. That is, the first embodiment has proposed a method of using traffic indication indexes with a bitmap structure instead of using a series of Basic CIDs designating the MSS. The second embodiment has proposed a method of using a Sleep ID (SLPID) for identifying a MSS operating in the sleep mode, instead of using a series of Basic CIDs designating the MSS.

As described above, the first and second embodiments of the present invention have proposed a method of using a traffic indication index and a Sleep ID instead of a Basic CID included in the traffic indication message. However, the present invention is not restricted to the first and second embodiments, and it is possible to use a combination of the first and second embodiments. For example, it is possible to perform location allocation using a combination of the first and second embodiments, i.e., using the Sleep ID in the bitmap structure.

Third Embodiment

A third embodiment of the present invention proposes a method for directing an MSS staying in a listening interval to state transition to the sleep mode in order to prevent power consumption of the MSS.

Conventionally, if the BS does not include Positive Indication for a corresponding MSS in a traffic indication message among the MSSs staying in their listening intervals, the MSS continuously maintain the awake mode while waiting for a traffic indication message until expiration of the listening interval. However, the BS may not direct the MSS staying in the listening interval to state transition to the awake mode based on service scheduling for which load balancing on all MSSs is taken into consideration.

As a result, the MSS unnecessarily wastes its power until the remaining listening interval. In order to prevent the waste of power, the third embodiment extends the traffic indication message illustrated in Table 5, and the extended traffic indication message is illustrated in Table 10.

TABLE 10

| Syntax | size | Note |
|---|---|---|
| TRF-IND_Message_Format( ) { | | |
| Management message type = 47 | 8 bit | |
| NUM_of_MSS_Group (4 MSS * N) | 8 bit | Num of MSS in BS |
| For(i=0; i < NUM_of_MSS_Group; i++) { | | |
| Traffic_Indication_Index | 8 bit | the 2 bit are allocated for MSS as Basic CID respectively |
| } | | |
| } | | |

Referring to Table 10, the traffic indication message according to the third embodiment of the present invention, like the traffic indication message illustrated in Table 5, uses a series of traffic indication indexes with a bitmap structure, instead of a series of 16-bit Basic CIDs designating the MSSs. However, unlike the traffic indication message of Table 5, the traffic indication message of Table 10 indicates an action that should be taken by the MSS for the listening interval, and is comprised of a series of traffic indication indexes with two bits allocated, for one MSS.

In Table 10, Management Message Type is identical to the Management Message Type described in connection with Table 4, such that a detailed description thereof will be omitted. Num_of_MSS_Group defined in Table 10 indicates the number of groups, each including several MSSs as described with reference to Table 5. However, unlike Table 5, Table 10 shows that the number of MSSs included in one group is defined as, for example, 4.

The Num_of_MSS_Group is calculated as shown in Equation (3).

$$\text{Num\_of\_MSS\_Group} = \frac{Num\ of\ MSSs}{4} \quad (3)$$

A description of the Num_of_MSS_Group determined according to the number of MSSs that can be managed by the BS has been given with reference to Table 5. Unlike the Traffic_Indication_Index in the first embodiment, the Traffic_Indication_Index in the third embodiment is used to allocate two bits to each of 4 MSSs, to thereby specify an action that should be taken by corresponding MSSs awaken from the sleep mode for the listening interval.

In the Traffic_Indication_Index, 2 bits allocated for specifying an action that should be taken by the MSS for the listening interval are set to the following values.

'00': This value is identical to the value '0' among the values of respective bits in the Traffic_indication_Index in the method for reducing a size of a traffic indication message according to the first embodiment, in terms of meaning and an action taken by the MSS. This value is different from the value '0' in that because two bits are used, the BS sets the two bits to '00'.

'11': This value is identical to the value '1' among the values of respective bits in the Traffic_indication_Index in the method for reducing a size of a traffic indication message according to the first embodiment, in terms of meaning and an action taken by the MSS. Therefore, a detailed description thereof will be omitted herein.

'01': This value indicates that because the BS sends no traffic to a corresponding MSS awaken for the listening interval, the corresponding MSS no longer waits for a traffic indication message, and immediately state transitions to the sleep mode. After state transitioning to the sleep mode, it is preferable for the MSS to maintain the sleep mode for the remaining listening interval and a newly updated sleep interval.

'10': This value is a reserved value, and can be used for other purposes.

Figure 12:
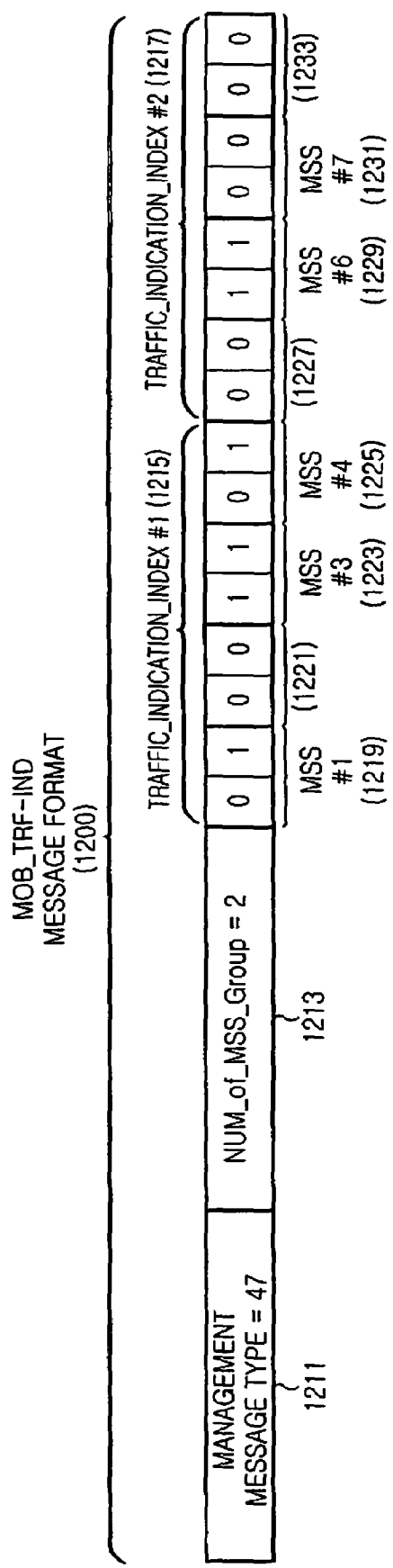
FIG. 12 is a diagram illustrating a format of a traffic indication message transmitted from a BS to an MSS according to a third embodiment of the present invention.

FIG. 12 is a diagram illustrating a format of a traffic indication message broadcasted from a BS to an MSS according to the third embodiment of the present invention. Referring to FIG. 12, a corresponding traffic indication message 1200 is comprised of parameters of Management Message Type 1211, Num_of_MSS_Group 1213, and Traffic_Indication_Indexes 1215 and 1217. However, before a detailed description of FIG. 12 is given, it will be assumed herein that the maximum number of MSSs that can be managed by the BS is 7. Therefore, it is assumed that the MSSs have been allocated the Basic CIDs described above from 1 to 7. In addition, it is assumed that MSSs having 1, 3, 4, 6, and 7 as the Basic CIDs are staying in their listening intervals, and thus are waiting for the traffic indication message transmitted from the BS on a broadcasting basis.

In FIG. 12, the Management Message Type 1211 indicates that the transmission message is a traffic indication message 1200, and the Num_of_MSS_Group 1213 is set to '2' in order to allow the BS to accommodate 7 MSSs according to the assumptions stated above. Therefore, two consecutive Traffic_Indication_Indexes 1215 and 1217 are used, and their respective bits are allocated to MSSs having 1 to 7 as the Basic CIDs in two bits. On this assumption, because MSSs 1219, 1223, 1225, 1229, and 1231 having 1, 3, 4, 6, and 7 as Basic CIDs, respectively, among all MSSs are staying in the listening interval, the MSSs 1219, 1223, 1225, 1229, and 1231 wait for the traffic indication message 1200. Thereafter, if the traffic indication message is received, the MSSs 1219, 1223, 1225, 1229, and 1231 read corresponding 2-bit values from the Traffic_Indication_Indexes of the received traffic indication message.

For example, the MSS 1219 having a Basic CID of 1 reads a value of allocated first two bits from the Traffic_Indication_Index 1215. In this case, because the corresponding 2-bit value is '01', the BS transmits no traffic for the listening interval of the MSS 1219 as described above. Therefore, the MSS 1219 immediately state transitions to the sleep mode without waiting for the traffic indication message for the listening interval, and maintains the sleep mode until the next listening interval starts.

Unlike this, the MSS 1229 having a Basic CID of 6 reads a $6^{th}$ 2-bit value from the Traffic_Indication_Index 1217. In this case, because the corresponding 2-bit value is '11', there is data to be received from the BS for the listening interval of the MSS 1229. Therefore, the MSS 1229 should state transition to the awake mode and wait for traffic transmitted from the BS.

In addition, the MSS 1231 having a Basic CID of 7 reads a $7^{th}$ 2-bit value from the Traffic_Indication_Index 1217. In this case, because the corresponding 2-bit value is '00', there is possible data to be received from the BS for the listening interval. Therefore, the MSS 1231 should wait for a traffic indication message until expiration of the listening interval.

In FIG. 12, reference numerals 1221 and 1227 indicate an absence of bits because the corresponding MSSs are in the awake mode or the sleep mode, as described with reference to the '00'-bit value in the Traffic_Indication_Index. In addition, because reference numeral 1233 does not fall within a range of the number of MSSs that can be managed by the BS, corresponding bits are set to a meaningless value '00'.

The traffic indication message defined in Table 10 can also have a message format having a variable length as describe in the first embodiment of the present invention. The traffic indication message is identical in format to the traffic indication message illustrated in FIG. 7, such that a detailed description thereof will be omitted herein.

Figure 13:
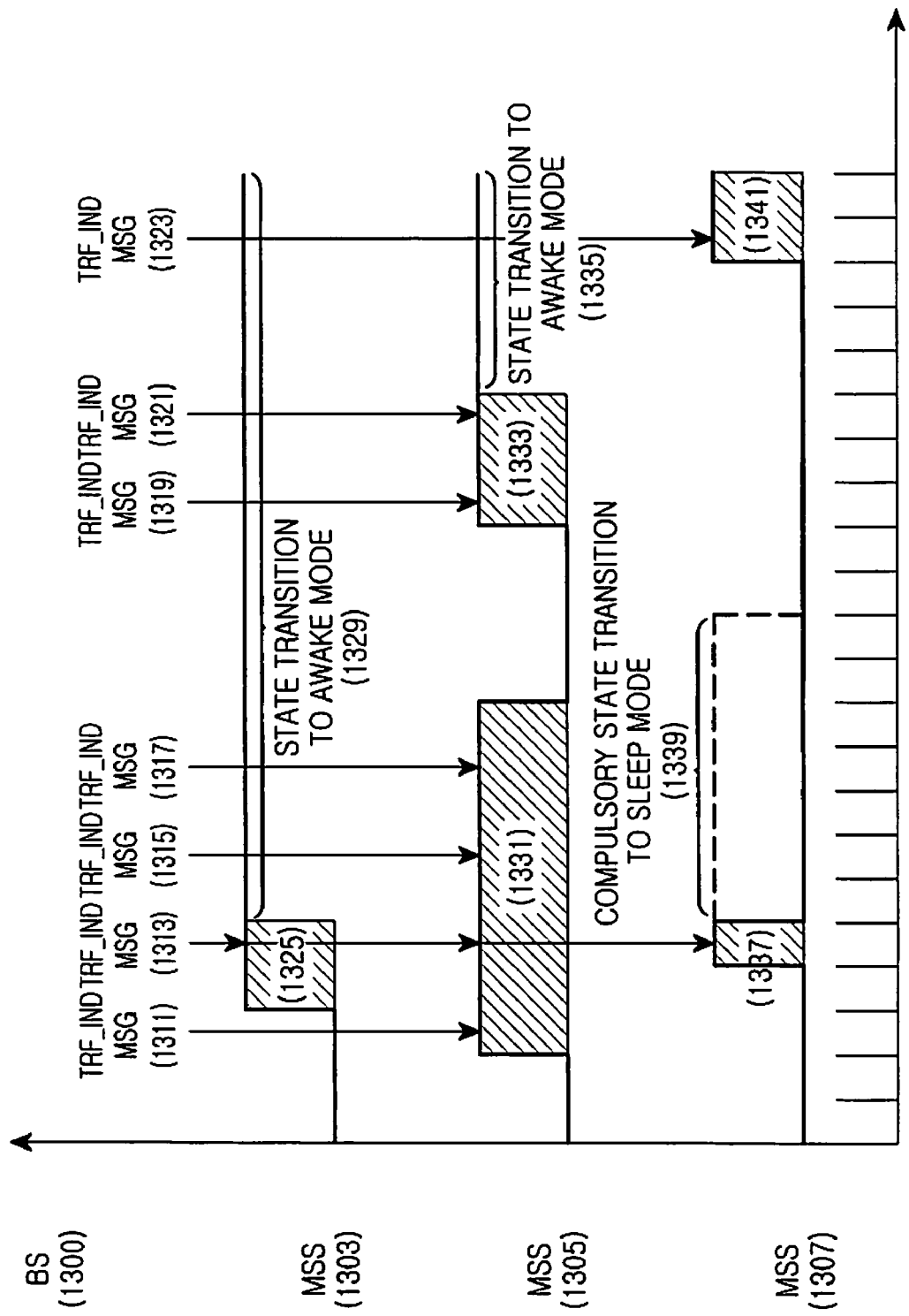
FIG. 13 is a diagram illustrating a process of state transitioning by a MSS based on a traffic indication index value in a traffic indication message according to the third embodiment of the present invention.

FIG. 13 is a diagram illustrating a process of compulsory state transitioning to an awake mode by an MSS in response to a request based on a Traffic_Indication_Index value in a traffic indication message received for a listening interval in the IEEE 802.16e communication system according to an embodiment of the present invention. Referring to FIG. 13, a BS 1300 transmits traffic indication messages 1311, 1313, 1315, 1317, 1319, 1321, and 1323 to MSSs 1303, 1305, and 1307 staying in a listening interval.

In FIG. 13, arrows of the traffic indication messages indicate that the corresponding MSSs have received the corresponding traffic indication messages. The BS 1300 transmits the traffic indication message to the MSSs 1303, 1305, and 1307 on a broadcasting basis. In this case, MSSs staying in the sleep mode or the awake mode do not decode and analyze the traffic indication message.

The traffic indication message includes the information elements described with reference to Table 10. The MSSs determine the actions they should take at the next frame, based on corresponding two bits in Traffic_Indication_Index illustrated in Table 10. FIG. 13 illustrates operations of corresponding MSSs based on the traffic indication message defined in Table 10.

The MSS 1303 receives the traffic indication message 1313 for a listening interval 1325, extracts two bits corresponding to a Basic CID of the MSS 1303 from the Traffic_Indication_Index described in connection with Table 10, and analyzes the extracted two bits. Herein, because the 2-bit value corresponding to the Basic CID is '11', the MSS 1303 state transitions to the awake mode (1329) regardless of the remaining listening interval.

Next, the MSS 1305 receives the traffic indication message 1311 for a listening interval 1331, extracts two bits corresponding to a Basic CID of the MSS 1305 from the Traffic_Indication_Index described in connection with Table 10, and analyzes the extracted two bits. Because the 2-bit value corresponding to the Basic CID is '00', the MSS 1305 waits for the next traffic indication message until expiration of the remaining listening interval. Thereafter, because corresponding two bits in the next traffic indication messages 1313, 1315 and 1317 transmitted by the BS 1300 are also '00', the MSS 1305 waits for the next traffic indication message until expiration of the listening interval. In this case, as illustrated in FIG. 13, as the listening interval 1331 expires, the MSS 1305 doubles the existing sleep interval, state transitions to the sleep mode, and maintains the sleep mode for the doubled sleep interval.

After a lapse of a predetermined time in the sleep mode, the MSS 1305 waits again for a traffic indication message for the next listening interval 1333. In this case, because a corresponding 2-bit value in the received traffic indication message is '00', the MSS 1305 waits for the next traffic indication message until expiration of the remaining listening interval. However, because a corresponding 2-bit value in the received traffic indication message 1321 is '11', the MSS 1305 state transitions to the awake mode at step 1335, regardless of the remaining listening interval.

Next, the MSS 1307 receives the traffic indication message 1313 for a listening interval 1337, extracts two bits corresponding to a Basic CID of the MSS 1307 from the Traffic_Indication_Index described in connection with Table 10, and analyzes the extracted two bits. Herein, because the extracted 2-bit value is '01', the MSS 1307 state transitions to the sleep mode regardless of the remaining listening interval 1337, thereby minimizing power consumption.

After the compulsory state transition to the sleep mode at step 1339, the MSS 1307 maintains the sleep mode for a time determined by adding up the remaining listening interval and a doubled sleep interval. Next, the MSS 1307 receives and decodes the traffic indication message 1323 for a new listening interval 1341.

In the foregoing description, operations of the thee MSSs 1303, 1305, and 1307 cover all possible cases and operations occurring in the traffic indication message described in conjunction with Table 10. That is, with reference to FIG. 13, a description has been made of an operation in which a MSS state transitions to the awake mode according to an operating condition requested by a BS, waits for a traffic indication message, or makes a compulsory state transition to the sleep mode, for a listening interval.

Figure 14:
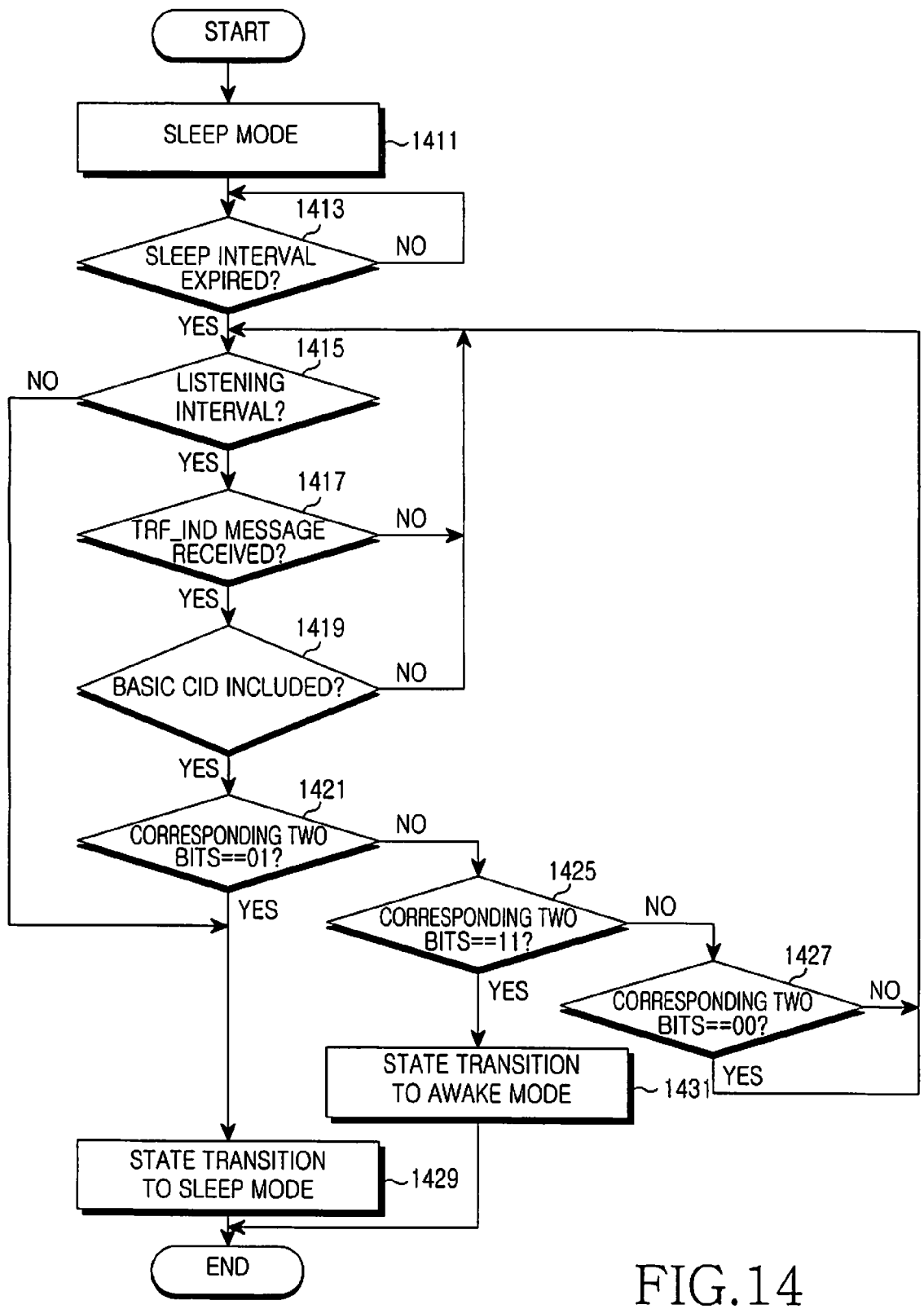
FIG. 14 is a flowchart illustrating a process of state transitioning by an MSS using a traffic indication message according to the third embodiment of the present invention.

FIG. 14 is a flowchart illustrating a process of compulsory state transitioning by an MSS in response to a request from a BS for a listening interval according to the third embodiment of the present invention. Referring to FIG. 14, an MSS staying in the sleep mode at step 1411 proceeds to step 1413. In step 1413, the MSS determines whether a sleep interval has expired, i.e., whether it should further stay in the sleep mode. If it is determined that the sleep interval has expired, the MSS proceeds to step 1415. However, if it is determined that the sleep interval has not expired, the MSS returns to step 1413.

In step 1415, the MSS determines whether a listening interval has expired. If it is determined that the listening interval has expired, the MSS proceeds to step 1429, where it state transitions to the sleep mode. However, if it is determined in step 1415 that the listening interval has not expired, the MSS proceeds to step 1417.

In step 1417, the MSS determines whether a traffic indication message is received from the BS. If it is determined that a traffic indication message is received from the BS, the MSS proceeds to step 1419. However, if it is determined in step 1417 that no traffic indication message is received from the BS, the MSS returns to step 1415.

In step 1419, the MSS determines whether there are two bits in Traffic_Indication_Index described in connection with Table 10, being mapped to a Basic CID of the corresponding MSS, based on Num_of_MSS_Group included in the received traffic indication message. This means that the traffic indication message can have a variable traffic indication index. If it is determined that there are corresponding two bits, the MSS proceeds to step 1421. However, if it is determined in step 1419 that the corresponding two bits do not exist in the Traffic_Indication_Index, the MSS returns to step 1415, determining that no traffic indication message is received.

In step 1421, the MSS analyzes corresponding two bits indicating an action requested for the listening interval by the BS. If it is determined that the corresponding two bits are '01', the MSS proceeds to step 1429 where it state transitions to the sleep mode regardless of the remaining listening interval, thereby minimizing power consumption. However, if it is determined in step 1421 that the corresponding two bits are not '01', the MSS proceeds to step 1425.

In step 1425, the MSS determines whether the corresponding two bits are '11'. If it is determined that the corresponding two bits are '11', the MSS proceeds to step 1431 where it state transitions to the awake mode, considering that there is traffic to be received from the BS. However, if it is determined that the corresponding two bits are not '11', the MSS proceeds to step 1427.

In step 1427, the MSS determines whether the corresponding two bits are '00'. If it is determined that the corresponding two bits are '00', the MSS returns to step 1415 to receive again a traffic indication message described in connection with Table 10, because the BS may have traffic to be transmitted to the corresponding MSS. Also, if it is determined that the corresponding two bits are not '00', the MSS proceeds to step 1415 to receive again a traffic indication message, because it means that the corresponding two bits are '10' indicating a value reserved for other purposes.

As described above, the present invention is advantageous in that it supports sleep mode and awake mode operations in a Broadband Wireless Access communication system using an OFDM/OFMDA, i.e., an IEEE 802.16e communication system. More specifically, some of the advantages of the sleep mode and awake mode operations according to the present invention are as follows:

(1) In the IEEE 802.16e communication system, if a BS has traffic to be transmitted to a MSS staying in the sleep mode, the BS includes a series of 16-bit Basic CIDs designating the corresponding MSS in a traffic indication message as described above.

However, because a range of Basic CIDs designating MSSs in one BS occupies a very small part of Basic CID#1 to Basic CID#m among a total of 65536 Basic CIDs, 16-bit Basic CIDs include unnecessary most significant bits (MSBs). Therefore, an increase in number of MSSs that can be managed by the BS causes a waste of a bandwidth needed by the BS to transmit a traffic indication message. In addition, the BS directs a corresponding MSS to state transition to the awake mode using one or more traffic indication messages.

However, the present invention significantly reduces a length of a traffic indication message by using traffic indication indexes with a bitmap structure, instead of a series of Basic CIDs for the traffic indication message. Accordingly, it is possible to direct a MSS to state transition to the awake mode by transmitting only one traffic indication message.

(2) In the IEEE 802.16e communication system, an MSS in the sleep mode awakes for the listening interval and repeats a process of determining if there is a Basic CID designation the MSS while waiting for a traffic indication message transmitted by the BS. That is, if the MSS fails to receive a traffic indication message for the listening interval or there is no Basic CID in the traffic indication message even though the traffic indication message is received, the MSS continues to perform the above process.

Therefore, the BS is not required to direct the MSS staying in the listening interval to state transition to the awake mode based on service scheduling for which load balancing on all MSSs is taken into consideration. However, an MSS, which is not informed about the situation, waits for a traffic indication message, continuously and unnecessarily wasting its power until expiration of the listening interval.

However, the present invention uses traffic indication indexes with a bitmap structure used by the BS to identify an action that should be taken by the MSS instead of using the Basic CIDs in the traffic indication message transmitted for the listening interval. Accordingly, the BS directs the MSSs to state transition to the sleep mode, thereby minimizing unnecessary power consumption.

As can be understood from the foregoing description, the present invention remarkably reduces a length of a traffic indication message using traffic indication indexes with a bitmap structure, instead of Basic CIDs, when transmitting the traffic indication message in the BWA communication system. Accordingly, it is possible to direct an MSS to state transition to the awake mode by transmitting only one traffic indication message.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A system for transmitting a traffic indication message in a Broadband Wireless Access communication system, the system comprising:
  a base station (BS) for transmitting the traffic indication message to mobile subscriber stations (MSSs) in a listening interval,
  wherein the traffic indication message includes traffic indication indexes and a number of MSS groups, a number of the traffic indication indexes being identical to the number of the MSS groups,
  each of the MSS groups includes a predetermined number of MSSs,
  each of the traffic indication indexes is assigned to each of the MSS groups, and includes a bitmap including a predetermined number of bits,
  the predetermined number of bits is identical to the number of the MSSs included in each of the MSS groups,
  each of the predetermined number of the bits is assigned to each of the MSSs included in each of the MSS groups, and represents operation instruction information for each of the MSSs, and
  wherein the operation instruction information indicates one of at least three operations:
  a first operation in which a corresponding MSS immediately state transitions to a sleep mode, without waiting for reception of a next traffic indication message for the listening interval,
  a second operation in which the corresponding MSS maintains the sleep mode, after expiration of the listening interval, or
  a third operation in which the corresponding MSS state transitions to an awake mode.

2. The system of claim 1, wherein the one of the at least three operations is performed in the listening interval.

3. A system for receiving a traffic indication message in a Broadband Wireless Access communication system, the system comprising:
  a mobile subscriber station (MSS) for receiving the traffic indication message from a base station (BS) in a listening interval,
  wherein the traffic indication message includes traffic indication indexes and a number of MSS groups, a number of the traffic indication indexes being identical to the number of the MSS groups,
  each of the MSS groups includes a predetermined number of MSSs,
  each of the traffic indication indexes is assigned to each of the MSS groups, and includes a bitmap including a predetermined number of bits,
  the predetermined number of bits is identical to the number of the MSSs included in each of the MSS groups,
  each of the predetermined number of bits is assigned to each of the MSSs included in each of the MSS groups and represents operation instruction information for each of the MSSs, and
  wherein the operation instruction information indicates one of at least three operations:
  a first operation in which a corresponding MSS immediately state transitions to a sleep mode, without waiting for reception of a next traffic indication message for the listening interval,
  a second operation in which the corresponding MSS maintains the sleep mode, after expiration of the listening interval, or
  a third operation in which the corresponding MSS state transitions to an awake mode.

4. The system of claim 3, wherein the one of the at least three operations is performed during the listening interval.

5. A method for transmitting a traffic indication message by a base station (BS) in a Broadband Wireless Access communication system, the method comprising:
  transmitting the traffic indication message to mobile subscriber stations (MSSs) in a listening interval,
  wherein the traffic indication message includes traffic indication indexes and a number of MSS groups, a number of the traffic indication indexes being identical to the number of the MSS groups,
  each of the MSS groups includes a predetermined number of MSSs,
  each of the traffic indication indexes is assigned to each of the MSS groups, and includes a bitmap including a predetermined number of bits,
  the predetermined number of bits is identical to the number of the MSSs included in each of the MSS groups, each of the predetermined number of bits is assigned to each of the MSSs included in each of the MSS groups and represents operation instruction information for each of the MSSs, and wherein the operation instruction information indicates one of at least three operations:

a first operation in which a corresponding MSS immediately state transitions to a sleep mode, without waiting for reception of a next traffic indication message for the listening interval, a second operation in which the corresponding MSS maintains the sleep mode, after expiration of the listening interval, or a third operation in which the corresponding MSS state transitions to an awake mode.

6. The method of claim 5, wherein the one of the at least three operations is performed during the listening interval.

7. A method for receiving a traffic indication message by a mobile subscriber station (MSS) in a Broadband Wireless Access communication system, the method comprising:

receiving the traffic indication message from a base station (BS) in a listening interval, wherein the traffic indication message includes traffic indication indexes and a number of MSS groups, a number of the traffic indication indexes being identical to the number of the MSS groups, each of the MSS groups includes a predetermined number of MSSs, each of the traffic indication indexes is assigned to each of the MSS groups, and includes a bitmap including a predetermined number of bits, the predetermined number of bits is identical to the number of the MSSs included in each of the MSS groups, each of the predetermined number of bits is assigned to each of the MSSs included in each of the MSS groups and represents operation instruction information for each of the MSSs, and wherein the operation instruction information indicates one of at least three operations:

a first operation in which a corresponding MSS immediately state transitions to a sleep mode, without waiting for reception of a next traffic indication message for the listening interval, a second operation in which the corresponding MSS maintains the sleep mode, after expiration of the listening interval, or a third operation in which the corresponding MSS state transitions to an awake mode.

8. The method of claim 7, wherein the one of the at least three operations is performed in the listening interval.

* * * * *